United States Patent
Mori

(10) Patent No.: US 7,089,416 B1
(45) Date of Patent: Aug. 8, 2006

(54) INFORMATION COMMUNICATION APPARATUS AND METHOD, INFORMATION COMMUNICATION SYSTEM, AND MEMORY MEDIUM

(75) Inventor: Kurumi Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/412,900

(22) Filed: Oct. 5, 1999

(30) Foreign Application Priority Data

Oct. 9, 1998 (JP) ................................. 10-287774

(51) Int. Cl.
  *H04L 9/00* (2006.01)
  *H04L 9/32* (2006.01)
  *H04K 1/00* (2006.01)

(52) U.S. Cl. ...................... 713/162; 713/153; 713/182; 726/17; 726/19

(58) Field of Classification Search ................ 713/153, 713/162, 182, 201; 726/17, 19
See application file for complete search history.

(56) References Cited

U.S. PATENT DOCUMENTS

| 5,001,750 | A | * | 3/1991 | Kato et al. ................... 713/172 |
| 5,539,530 | A | | 7/1996 | Reifman et al. |
| 5,600,722 | A | * | 2/1997 | Yamaguchi et al. ......... 713/155 |
| 6,256,391 | B1 | * | 7/2001 | Ishiguro et al. ............. 380/278 |
| 6,457,040 | B1 | * | 9/2002 | Mizuhara et al. ........... 713/201 |

* cited by examiner

Primary Examiner—Matthew Smithers
Assistant Examiner—Courtney Fields
(74) Attorney, Agent, or Firm—Morgan & Finnegan, LLP

(57) ABSTRACT

It is intended, in the mobile information terminal, to achieve compactization, cost reduction and reduction in the burden of information processing, while taking the enciphering process for the information into consideration.

The cipher signal process unit for enciphering the transmission information and the cipher process selection unit for selecting whether or not to use the cipher signal process unit are provided to select whether or not to execute the enciphering of the transmission information, according to the necessity in executing the communication of information, thereby dispensing the enciphering process as far as possible and alleviating the burden of the process involved in the enciphering. Also by executing the enciphering or not respectively in case the deciphering is possible or not in the information receiving side, the cipher process means may be dispensed with in the information communication apparatus of the receiving side, whereby the apparatus of the receiving side can be made less expensive and smaller.

10 Claims, 16 Drawing Sheets

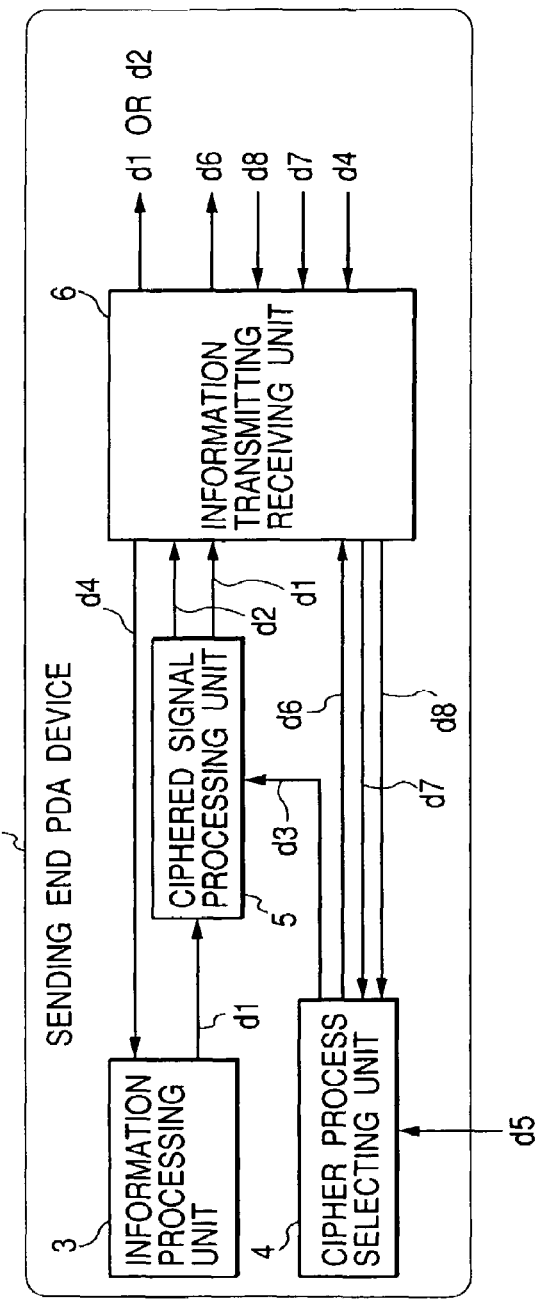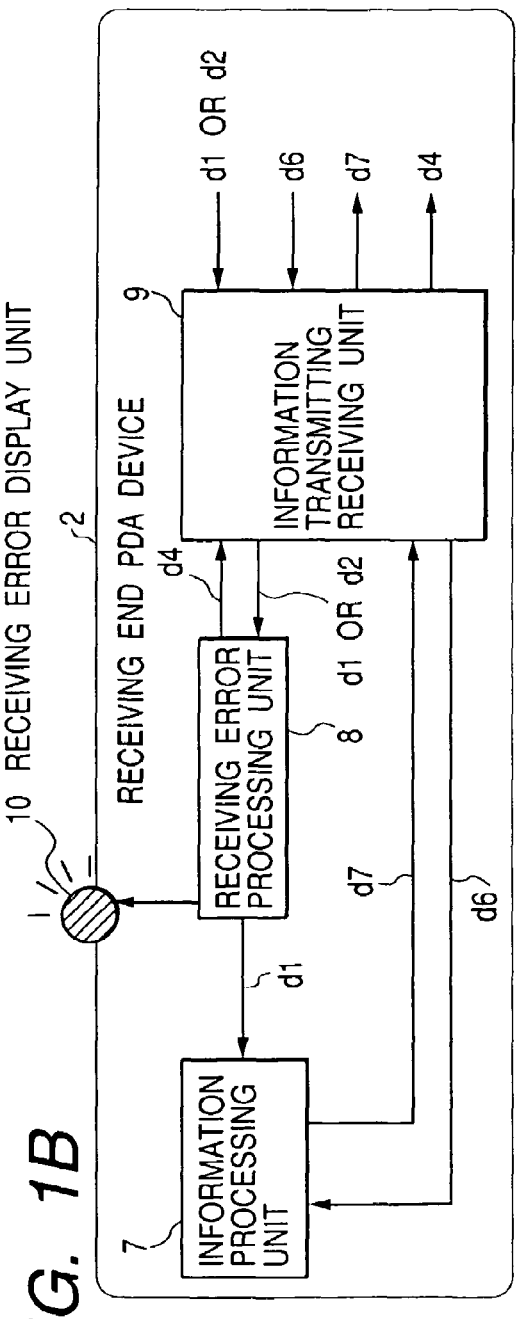

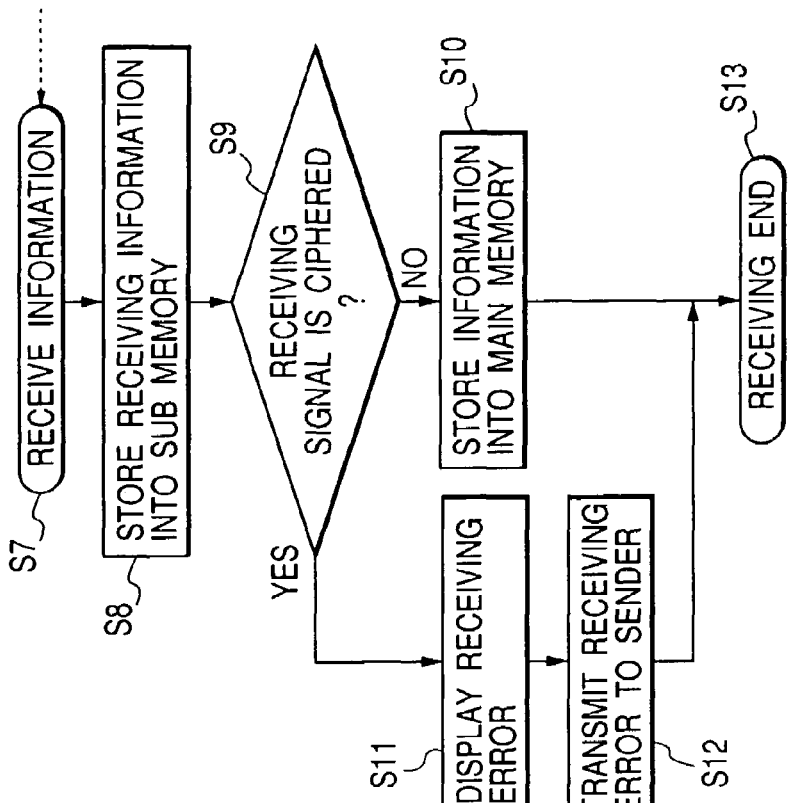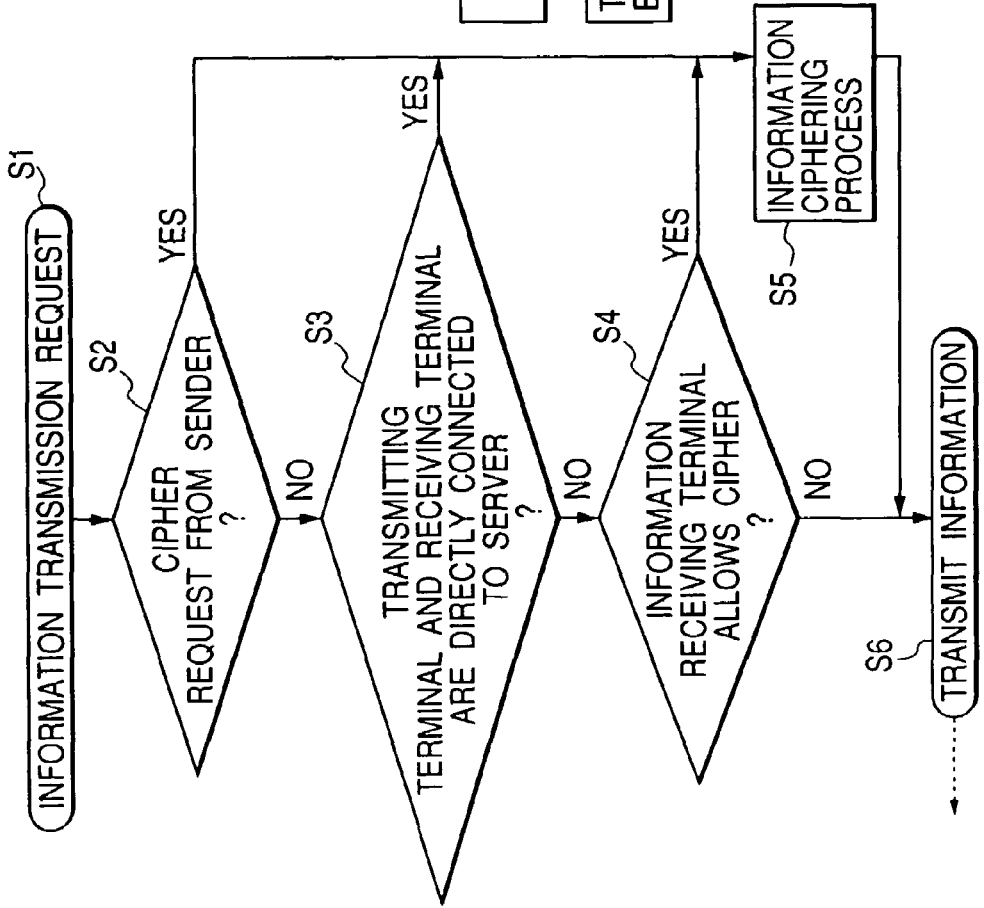

(CABLE CROSS SECTION DIAGRAM)

(EXCLUSIVE OR SIGNAL OF DATA AND STROBE)

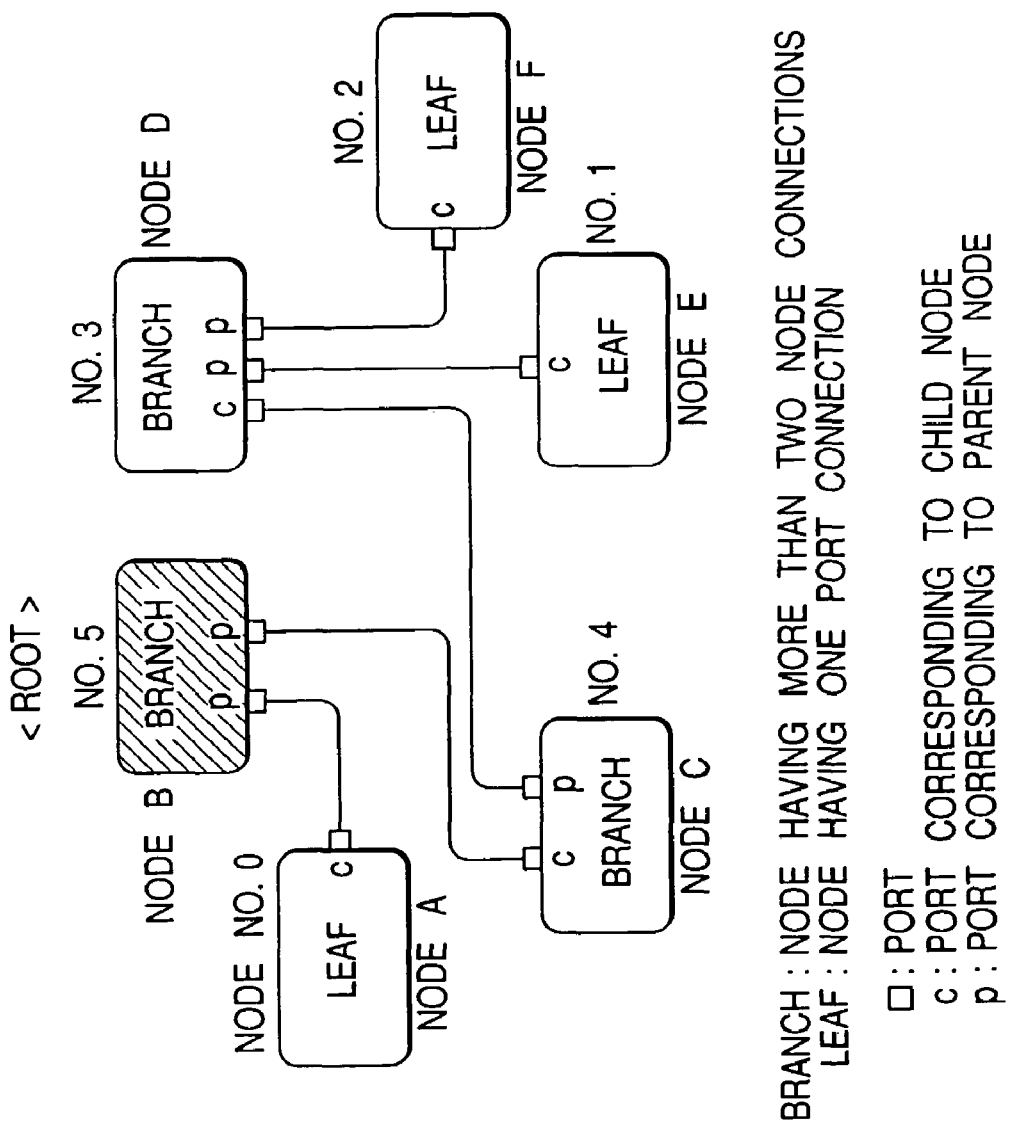

INFORMATION COMMUNICATION APPARATUS AND METHOD, INFORMATION COMMUNICATION SYSTEM, AND MEMORY MEDIUM

BACKGROUND OF THE INVENTION

1. Field of the Invention

The present invention relates to an information communication apparatus having cipher processing function, a method, an information communication system and a memory medium therefor.

2. Related Background Art

The information communication apparatus, represented by mobile communication terminal, has shown remarkable progress in compactization, higher performance and higher speed in information processing, and there are already commercialized mobile communication terminals that are comparable in performance to the desk-top computers. Because of such tendency, the mobile communication terminals are rapidly becoming popular in the business field, in enabling rapid information exchange by wireless communication even when one is not in the office. In such form of communication, the leak of secrecy is always a major concern. Therefore the corporations engaged in the development of the information communication apparatus are actively the development of cipher process technology of the transmitted information.

On the other hand, the amount of the processed information is rapidly growing, such as taking, fetching and transmitting the digital image in the communication function, and the performance required for the information signal processing unit will become even larger, as the moving image will also be processed in the future. Furthermore, the mobile communication terminal integrating the digital camera for image fetching has been recently commercialized and the mobile communication terminal including the digital video camera will also appear in the near future.

However, because of such advancement in the performance of the mobile information terminal, it is increasingly becoming difficult to achieve compactization important for mobility, in comparison with the conventional products provided solely with the communication function of the information editing function. In order to additionally include the cipher process in the above-described situation, it is important not only to increase the information processing speed but also to reduce the dimension of the entire information communication apparatus including the cipher processing device.

As explained in the foregoing, the current issues associated with the information communication apparatus are the cost increase resulting from the increase in the performance, the enormous increase in the amount of information to be handled, including images, and the difficulty in compactization particularly in the mobile terminal or the like.

Also the apparatus capable of cipher process is recently attracting attention, and various communication apparatus with the enciphering means are expected to be commercialized in the future. On the other hand, in the home use, the level of secrecy of the information to be handled is relatively low, so that the enciphering process may not be essential. However, if the enciphered information is always transmitted, the receiving side has to be equipped with the deciphering device for reading the enciphered information. As a result, the increase in the dimension of the apparatus, in the cost and in the burden for the information processing is unavoidable in the transmitting side and in the receiving side.

SUMMARY OF THE INVENTION

The object of the present invention is to resolve such difficulties, and to achieve reduction in the dimension, the cost and the burden for the information processing in the mobile information terminal, while taking the information enciphering process in consideration.

The above-mentioned object can be attained, according to an embodiment of the present invention, by an information communication apparatus comprising enciphering means for the transmission information, and cipher process selection means for selecting whether or not to use the enciphering means in executing communication of information.

The cipher process selection means mentioned above may be provided with designation means for designating whether or not to execute enciphering of the transmission information, and the enciphering means may be used or not according to the designation by the information transmitting person.

Also the cipher process selection means mentioned above may be provided with medium discrimination means for discriminating the communication medium connecting the information transmitting apparatus and the information receiving apparatus, and the enciphering means may be used or not according to the communication medium employed.

Furthermore, the cipher process selection means mentioned above may be provided with cipher permission discrimination means for discriminating whether the information receiving apparatus is capable of deciphering the cipher, and the enciphering means may be used or not according to the result of such discrimination.

Furthermore, the cipher process selection means mentioned above may be provided with secrecy level discrimination means for discriminating the level of secrecy of the transmission information, and the enciphering means may be used or not according to the result of such discrimination.

According to another embodiment of the present invention, there is provided an information communication apparatus comprising cipher discrimination means for discriminating whether the reception information is enciphered, and error process means for executing a predetermined error process in case the cipher discrimination means identifies that the reception information is enciphered.

Also the information communication method of the present invention is featured, in executing communication of information, by selecting whether or not to use the enciphering process for the transmission information.

Also whether or not to use the enciphering process for the transmission information may be selected according to the designation by the information transmitting person.

Furthermore, whether or not to use the enciphering process for the transmission information may be selected according to the communication medium employed, among different communication media enabling communication between the information transmitting apparatus and the information receiving apparatus.

Furthermore, whether or not to use the enciphering process for the transmission information may be selected according to the result of discrimination whether the deciphering is possible in the information receiving apparatus.

Furthermore, whether or not to use the enciphering process for the transmission information may be selected according to the level of secrecy of the transmission information.

Another embodiment of the present invention is featured by discriminating whether the reception information is enciphered, and, if enciphered, executing a predetermined error process.

According to the present invention, there is also provided an information communication system comprising an information transmitting apparatus including enciphering means for the transmission information and cipher process selection means for selecting whether or not to use the enciphering means at the execution of communication of information, and an information receiving apparatus including decoding means for decoding non-ciphered reception information, cipher discrimination means for discriminating whether the reception information is enciphered, and error process means for executing a predetermined error process in case the reception information is identified as being enciphered.

According to another embodiment of the present invention, the information communication system comprises an information transmitting apparatus including enciphering means for the transmission information and cipher process selection means for selecting whether or not to use the enciphering means at the execution of communication of information, and an information receiving apparatus including cipher discrimination means for discriminating whether the reception information is enciphered and decoding means for decoding the enciphered reception information in case the reception information is identified as being enciphered.

According to the present invention, there is also provided a computer readable memory medium storing a program serving as means in any of claims 1 to 6 for causing a computer to function.

In another embodiment of the present invention, the computer readable memory medium is featured by storing a program for causing a computer to execute an information communication method according to any of claims 7 to 12.

Still other objects of the present invention, and the features thereof, will become fully apparent from the following description which is to be taken in conjunction with the attached drawings.

BRIEF DESCRIPTION OF THE DRAWINGS

FIGS. 1A and 1B are schematic views showing the configuration of a mobile terminal of the transmitting side and a mobile terminal of the receiving side in an embodiment of the present invention;

FIGS. 2A and 2B are flow charts showing the function of the transmitting mobile terminal and the receiving mobile terminal of the above-mentioned embodiment;

FIG. 9 is a view showing an example of the network system constituted with the 1394 serial buses;

DETAILED DESCRIPTION OF THE PREFERRED EMBODIMENTS

First Embodiment

In the following, there will be explained an embodiment of the present invention with reference to the attached drawings.

The present embodiment contemplates, as the digital I/F for connecting devices, the IEEE 1394 serial bus in addition to the wireless connection. Therefore an explanation will be given in advance on the IEEE 1394 serial bus.

[Outline of IEEE 1394 Serial Bus Technology]

With the commercialization of the home-use digital video tape recorder and the DVD, there is being requested a supporting technology for transferring a large amount of data, such as video or audio data, on real-time basis. For transferring such video or audio data on real-time basis for fetching into a personal computer or transferring to another digital device, there is required an interface provided with required transferring functions and capable of high-speed data transfer. Based on such background, there has been developed the IEEE 1394-1995 (high performance serial bus) which will be hereinafter called the 1394 serial bus.

Figure 4:
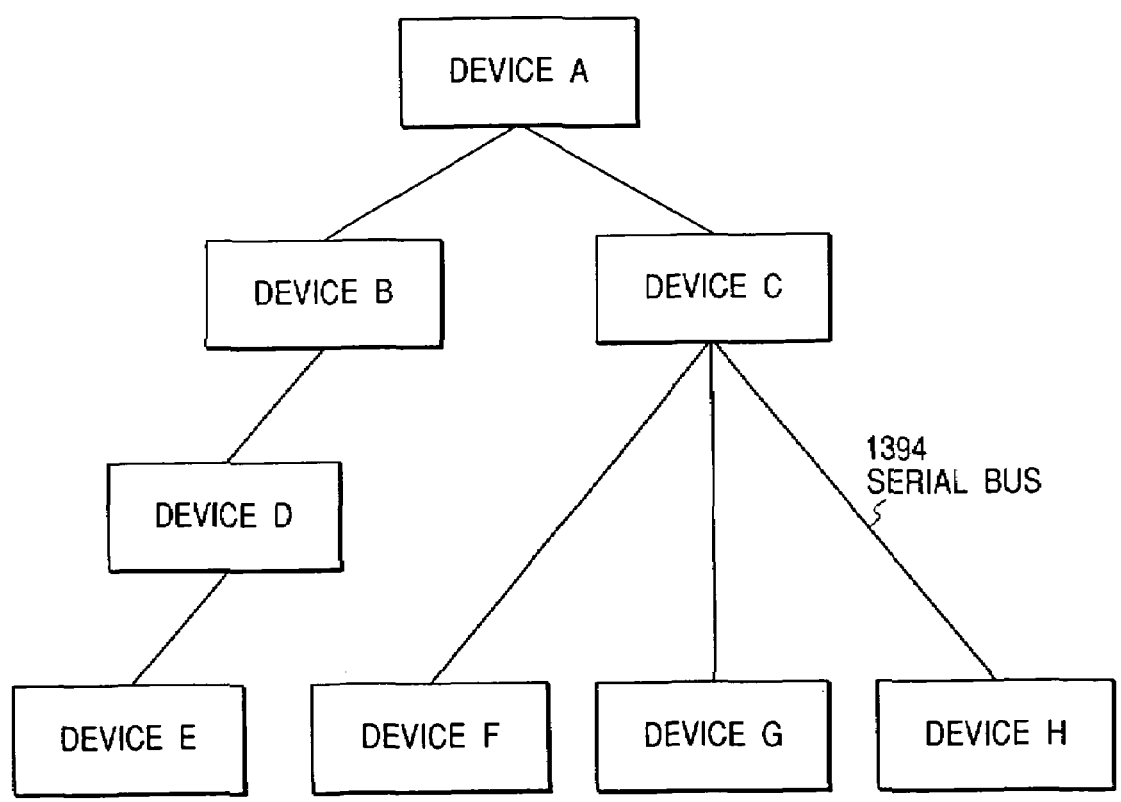
FIG. 4 is a view showing an example of a network system constituted with 1394 serial buses.

FIG. 4 shows an example of the network system constituted with the 1394 serial buses. The system is provided with plural devices A, B, C, D, E, F, G and H, and each of the connections A-B, A-C, B-D, D-E, C-F, C-G and C-H is made with a twisted pair cable of the 1394 serial bus. The connection method of the devices allows mixed presence of the daisy chain system and the node branch system, and enables a large freedom in the connection. Examples of the devices A to H are a personal computer, a digital video tape recorder, a DVD, a digital camera, a hard disk, a monitor, etc.

Each device is provided with a specific ID, and the devices mutually recognize the ID's to constitute a network within the range connected by the 1394 serial buses. By connecting each pair of the digital devices with a single 1394 serial bus cable, each device performs the relaying function and all such devices constitute a single network.

Also the plug and play function, featuring the 1394 serial bus, allows the system to automatically recognize the device and the connection status thereof when the cable is connected to the device. Also, when a device is deleted from a system as shown in FIG. 4, or newly added thereto, the system automatically resets the network configuration and re-constructs the new network. This function allows to always set and recognize the current network configuration.

The 1394 serial bus is provided with data transfer rates of 100, 200 and 400 Mbps, and the device having a higher transfer rate also supports the lower transfer rate to achieve compatibility between various devices. Also the 1394 serial bus has an asynchronous transfer mode for transferring asynchronous data (hereinafter written as async data) such as control signals, and an isochronous transfer mode for transferring real-time isochronous data (hereinafter written as iso data) such as video or audio data. The async data and the iso data are transferred in mixed manner within each cycle (usually 125 µs) succeeding to the transfer of a cycle start packet (CSP) indicating the start of a cycle and giving priority to the transfer of the iso data.

Figure 5:
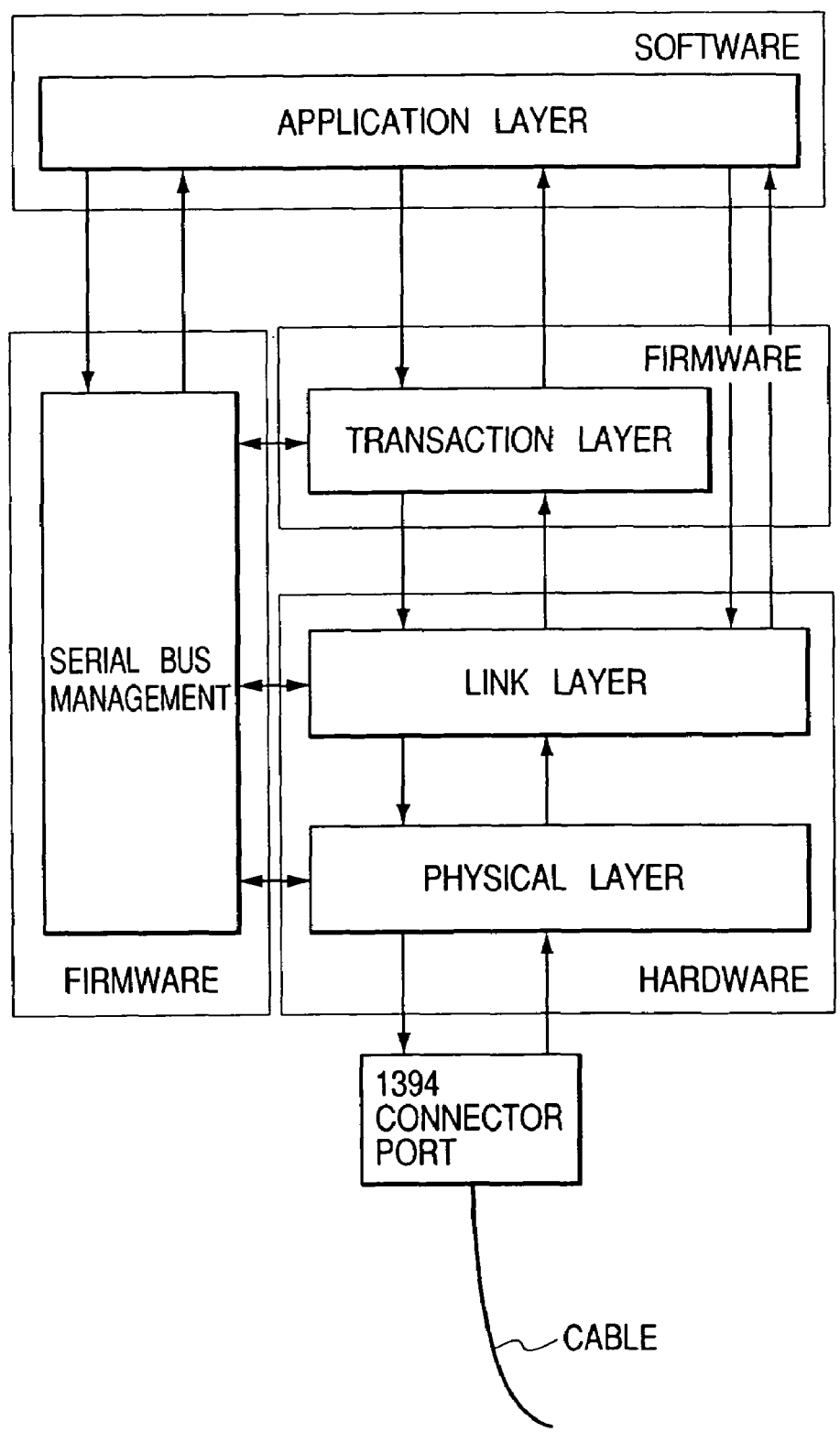
FIG. 5 is a view showing constituents of the 1394 serial bus.

FIG. 5 shows the constituents of the 1394 serial bus.

In general, the 1394 serial bus has a layered configuration. As shown in FIG. 5, a hardware component is represented by the cable of the 1394 serial bus, and there is provided a connector port to which connected is a connector of such cable. A physical layer and a link layer are provided thereon. The hardware part of the 1394 serial bus is practically constituted by an interface chip, in which the physical layer executes encoding and control related to the connector, and the link layer controls the packet transfer and the cycle time.

In a firmware part, a transaction layer manages the data to be transferred (transaction) and issues read and write commands. A serial bus management contained also in the firmware part manages the connection status of various connected devices and ID's thereof, thereby managing the configuration of the network. Such hardware part and the firmware part practically constitute the 1394 serial bus.

An application layer in a software part is variable depending on the software to be used. It also defines the data to be given to the interface and is defined by the protocol such as AV protocol.

Figure 6:
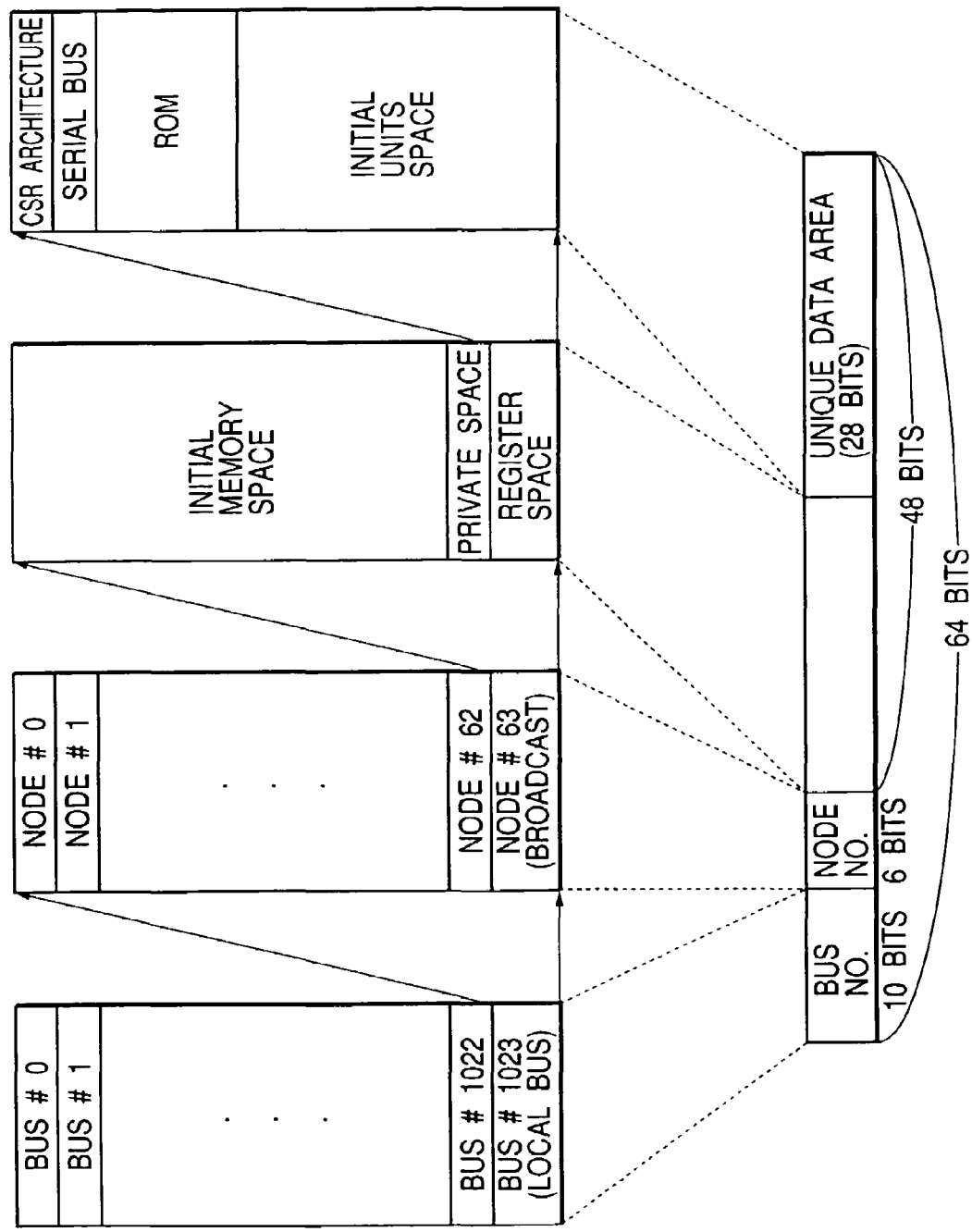
FIG. 6 is a view showing the address space in the 1394 serial bus.

FIG. 6 shows the address space in the 1394 serial bus.

Each device (node) connected to the 1394 serial bus is always given a 64-bit address specific to each device. Such address is stored in a ROM and can be always recognized by the own device or by any other device constituting the communication partner to enable communication with the designated communication partner.

The addressing of the 1394 serial bus is executed by a method based on the IEEE 1212 standard. In the above-mentioned address, the initial 10 bits are used for designating the bus number, and the next 6 bits are used for designating the node ID number. The remaining 48 bits constitute the address width assigned for the device and can be used as the specific address space. The last 28 bits within this space are used as a specific data area for storing information for identifying the device and for designating the condition of use therefor.

The foregoing description outlines the 1394 serial bus technology.

In the following there will be given a more detailed explanation on the technology featuring the 1394 serial bus.

[Electrical Specifications of IEEE 1394 Serial Bus]

Figure 7:
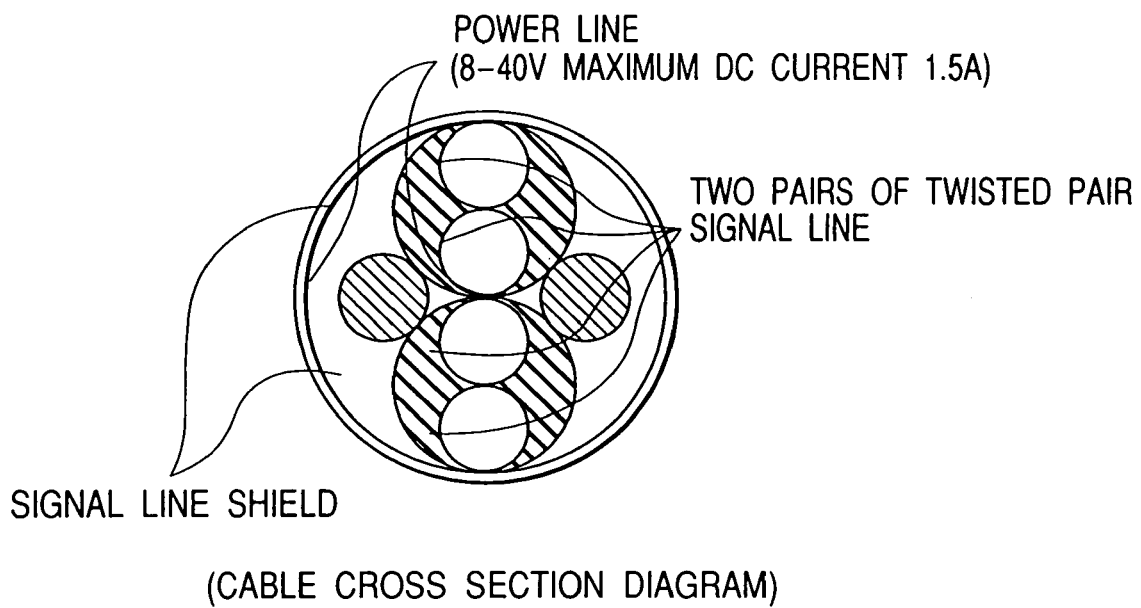
FIG. 7 is a cross-sectional view of a cable for the 1394 serial bus.

FIG. 7 is a cross-sectional view of the 1394 serial bus cable. The cable contains, in addition to two sets of twisted paired signal lines, power supply lines for enabling power supply to a device not provided with the own power source or even to a device in which the power supply voltage is lowered by a failure. The power supply current in the power supply lines is defined with a voltage of 8 to 40 V and a current of DC 1.5 A at maximum.

[DS-Link Encoding]

Figure 8:
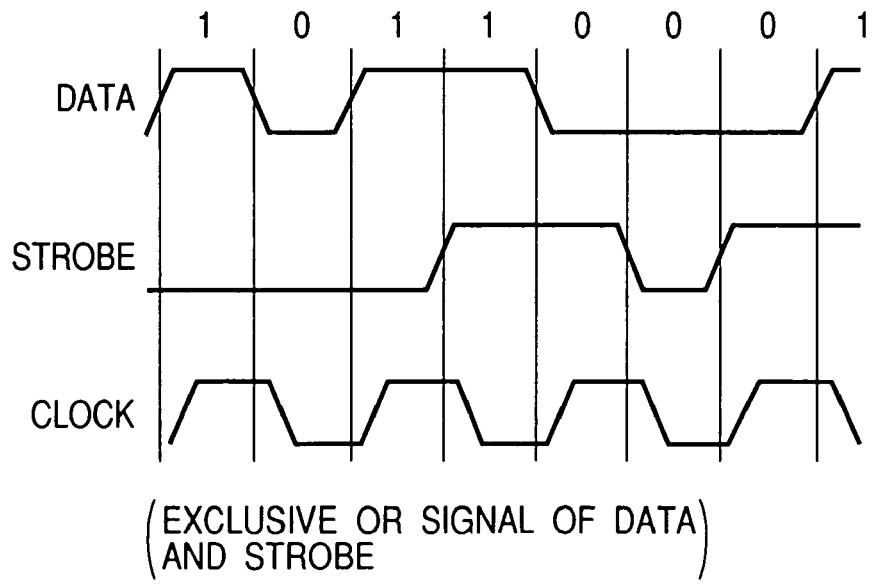
FIG. 8 is a view showing the DS-Link encoding method in the data transfer format employed in the 1394 serial bus.

FIG. 8 shows the DS-Link encoding method employed for the data transfer format in the 1394 serial bus.

The 1394 serial bus employs the DS-Link (data/strobe link) encoding method which is suitable for high speed serial data communication and requires two signal lines. Within the two twisted paired lines, one is principally used for transferring data and the other is used for transferring a strobe signal. The receiving side can reconstruct the clock signal by calculating the exclusive logic sum of the data and the strobe signal transferred.

The DS-Link encoding method has various advantages such as a higher transfer efficiency in comparison with other serial data transfer methods, a smaller circuit magnitude of the controller LSI because the phase locked loop circuit can be dispensed with, and a lower electric power consumption by maintaining the transceiver circuit of each device in the sleep state because it is unnecessary to send information indicating the idle state in the absence of the data to be transferred.

[Bus Resetting Sequence]

In the 1394 serial bus, each connected device (node) is given a node ID and is recognized as a constituent of the network. When it becomes necessary to recognize the network configuration anew by a change in the network configuration, for example a change in the number of nodes by deletion or addition of a node or by an on/off operation of the power supply, each node detecting such change transmits a bus resetting signal on the bus, thereby entering a mode for recognizing the new network configuration. The detection of the change is achieved by detecting a change in the bias voltage on the 1394 port board.

Receiving the bus resetting signal from a node, the physical layer of each node simultaneously transmits the generation of bus resetting to the link layer and also transmits the bus resetting signal to other nodes. The bus resetting is activated after the bus resetting signal is detected by all the nodes.

The bus resetting is activated not only by a hardware detection such as the insertion or extraction of a cable or an abnormality in the network such as explained above, but also by a direct command to the physical layer for example from a host equipment according to the protocol. The data transfer is interrupted with the activation of bus resetting and is restarted, after the bus resetting, under the new network configuration.

[Node ID Determination Sequence]

After the bus resetting, the nodes enter an operation of giving ID's thereto for constructing the new network configuration. The general sequence from the bus resetting to the node ID determination will be explained with reference to flow charts shown in FIGS. 16 to 18. The flow chart in FIG. 16 shows a series of bus operations from the generation of bus resetting to the determination of node ID whereupon the data transfer is enabled.

Figure 16:
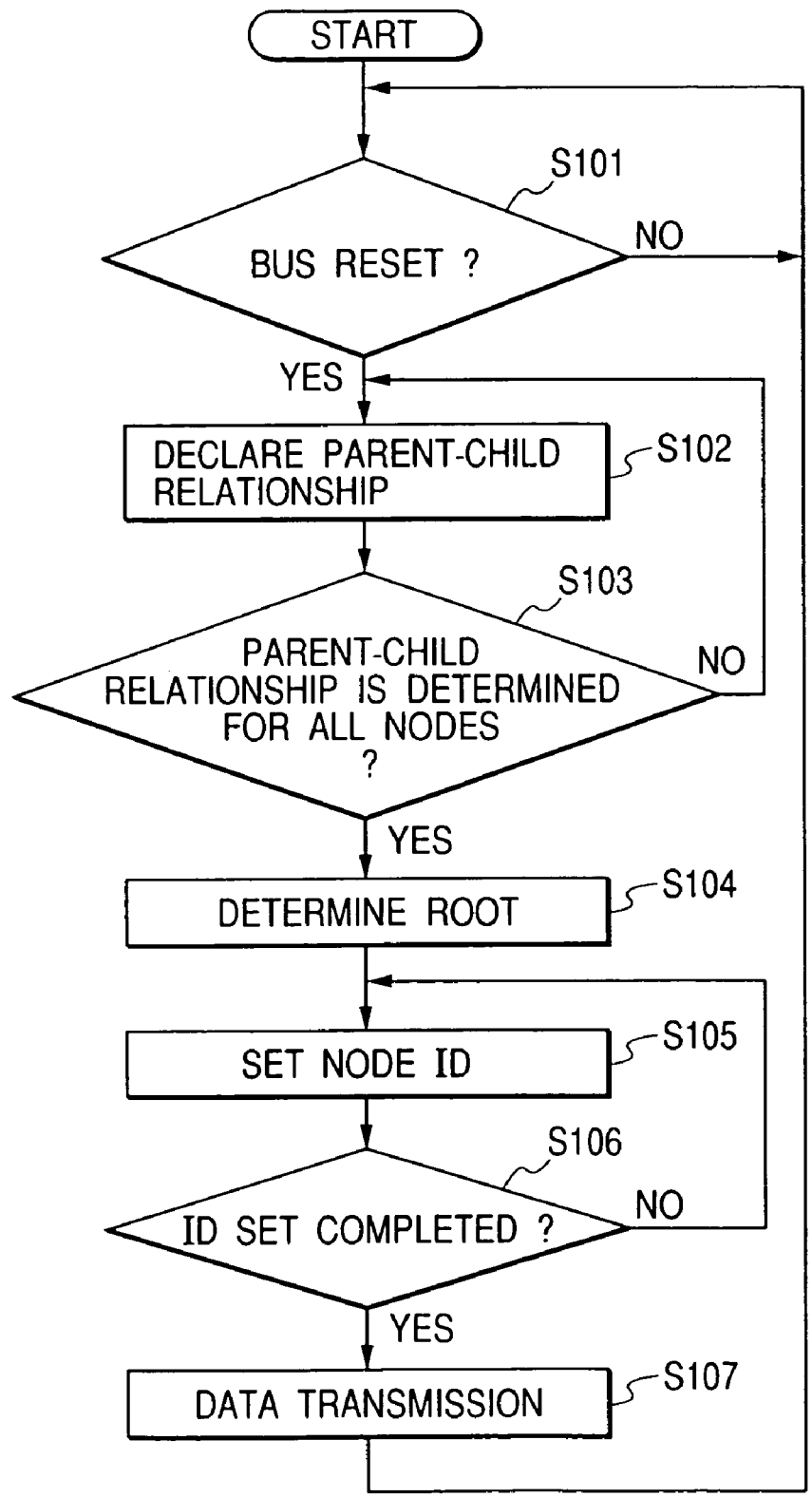
FIG. 16 is a flow chart showing a general sequence from the bus resetting the node ID determination.

Referring to FIG. 16, at first a step S101 constantly monitors the generation of a bus resetting in the network.

When a bus resetting is generated for example by a power on/off operation of the node a step S102 executes declaration of the parent-child relationship between the directly connected nodes in order to know the connection status of the new network.

When the parent-child relationship is determined among all the nodes in a step S103, a step S104 determines a root node. The declaration of the parent-child relationship in the step S102 is repeated and the root node is not determined, until the parent-child relationship is determined among all the nodes. After the root node determination in the step S104, a step S105 executes a node ID setting operation for giving ID to each node.

The node ID setting operation of the step S105 is repeated with a predetermined order of nodes, until all the nodes are given ID's. When a step S106 identifies the completion of ID setting in all the nodes, the new network configuration is recognized by all the nodes to enable data transfer among the nodes, and a step S107 initiates the data transfer. In the state of the step S107, the sequence returns to the step S101 to again assume the mode of monitoring the generation of bus resetting, and, if a bus resetting is generated, the setting operations of the steps S101 to S106 are repeated.

Figure 17:
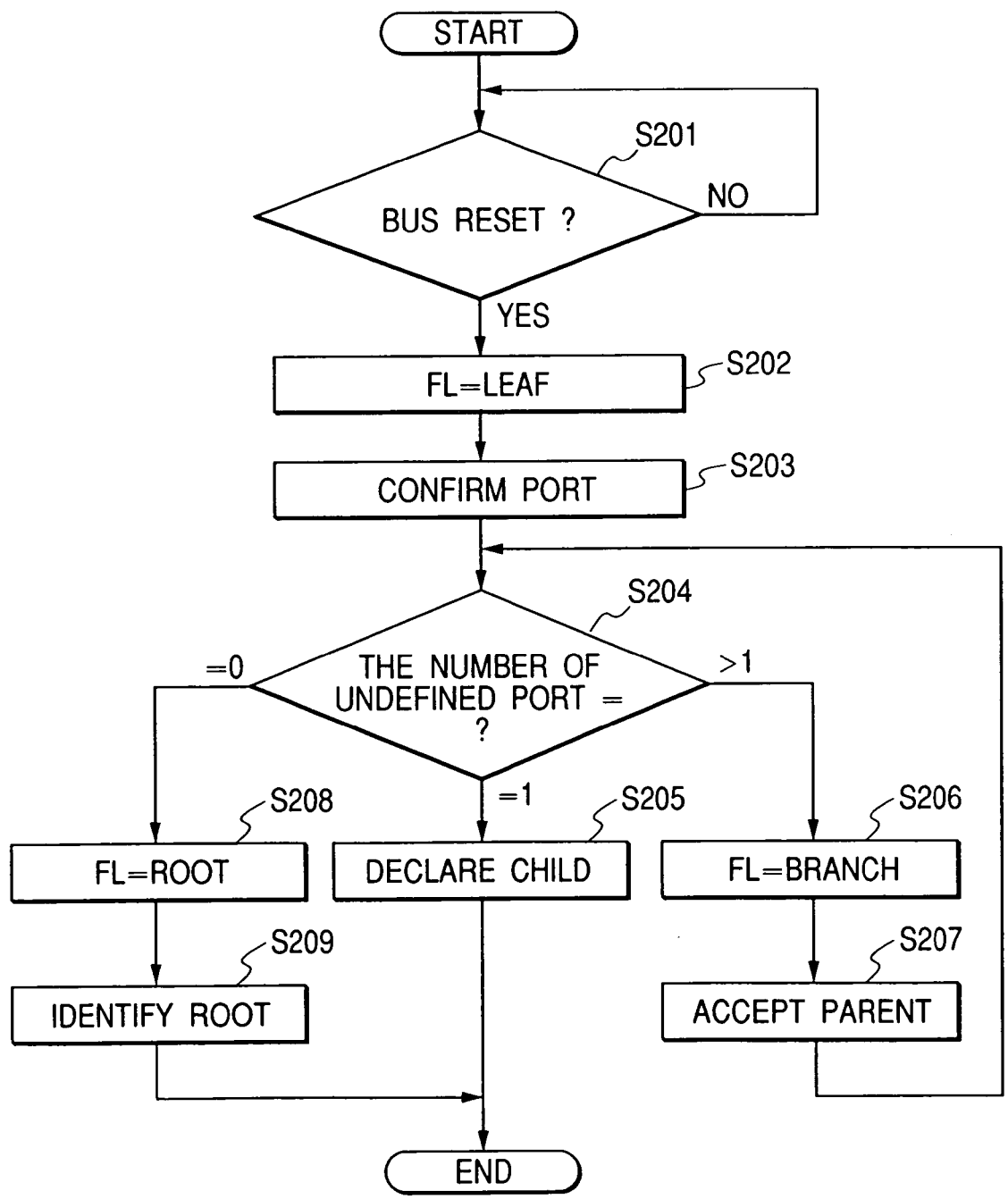
FIG. 17 is a flow chart showing the details of a sequence from the bus resetting to the root determination in the flow chart shown in FIG. 16.
Figure 18:
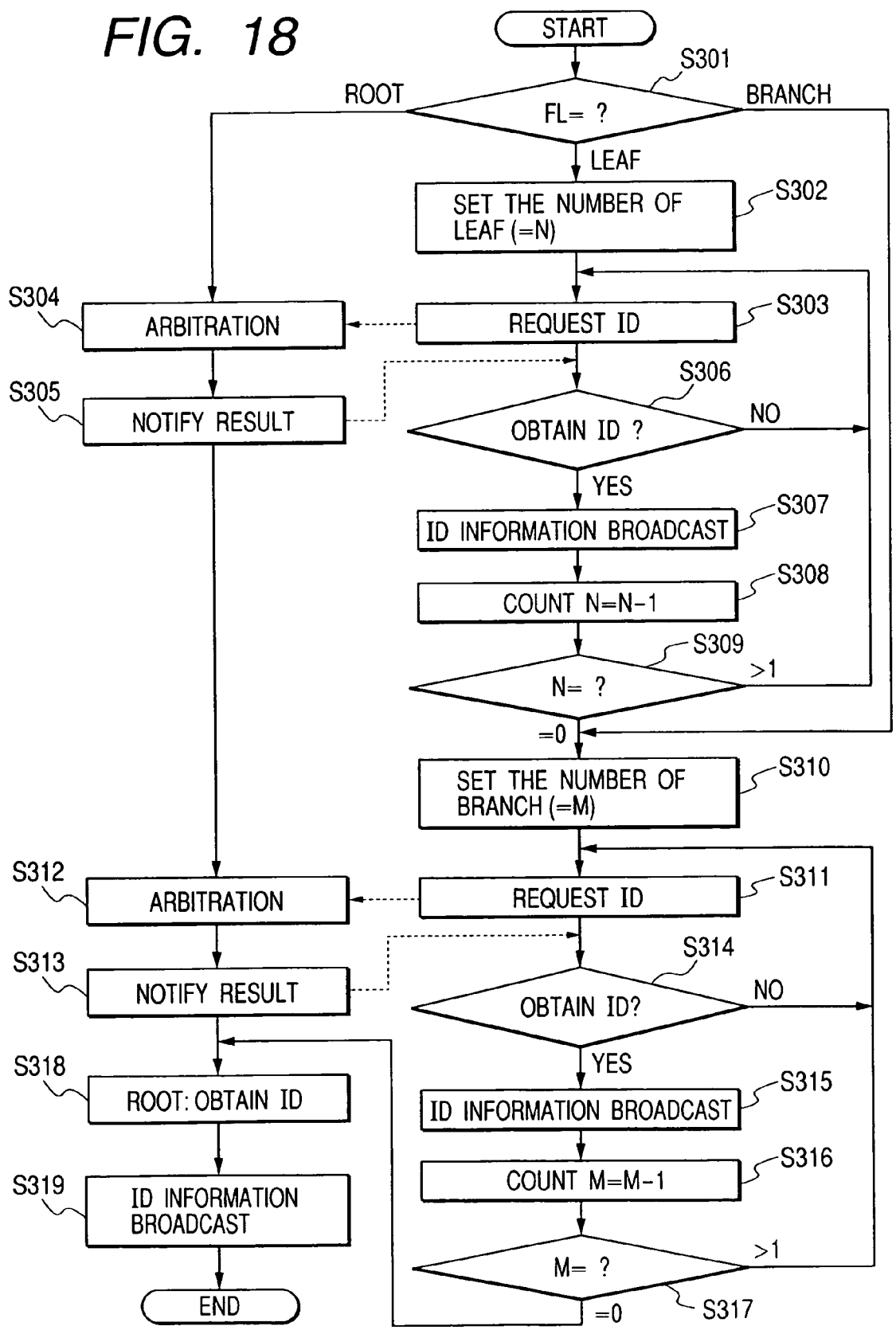
FIG. 18 is a flow chart showing the details of a sequence from the root determination to the completion of ID setting in the flow chart shown in FIG. 16.

In the foregoing there has been explained the sequence of the flow chart shown in FIG. 16, and a part from the bus resetting to the root determination and a part after the root determination to the completion of ID setting are respectively shown, in more details, in FIGS. 17 and 18.

At first there will be explained the flow chart shown in FIG. 17.

When a bus resetting occurs in a step S201, the network configuration is once reset. The step S201 constantly monitors the generation of the bus resetting. Then a step S202 sets, in each device, a flag indicating that the device is a leaf (node), as a first step of the operation for re-recognizing the connection status of the network after resetting. Then, in a step S203, each device checks the number of nodes to which the port of the device is connected.

According to the result indicating the number of ports in the step S203, a step S204 checks the number of undefined ports (for which the parent-child relationship is not determined) in order to start the declaration of the parent-child relationship. The number of ports is equal to the number of undefined ports immediately after the bus resetting, but, the number of undefined ports checked in the step S204 varies with the proceeding of determination of the parent-child relationship.

Immediately after the bus resetting, the declaration of the parent-child relationship can be started only from a leaf. A leaf means a node having only one undefined port, and being a leaf can be known from the confirmation of the number of ports in the step S203. The node recognized in the step S204 as a leaf declares, in a step S205, to a node connected thereto, that "the leaf itself is a child and the partner is a parent", and the sequence is terminated.

In a node having plural ports in the step S203 and recognized as a branch, the step S204 identifies that the number of the undefined ports>1 immediately after the bus resetting, so that the sequence proceeds to a step S206 in which the node is given a branch flag. Then, in a step S207 it waits to receive the position as parent in the parent-child declaration from a leaf.

The branch receiving the parent-child relationship declaration of the leaf in the step S207 confirms the number of the undefined ports checked in the step S204, and, if the number of the undefined ports has become 1, it can declare that "it is a child" in the step S205 to the node connected to the remaining port. The branch having two or more undefined ports in the step S204 in the second or subsequent cycle waits to receive the position as parent from a leaf or another branch in the step S207.

The declarations of the parent-child relationship is completed in the entire network when the number of the undefined ports checked in the step S204 becomes eventually zero in a branch or exceptionally a leaf (because of a belated declaration of being a child), and the unique node having zero undefined port (being determined as the port of all the parents) is given a root flag in a step S208 and is recognized as a root in a step S209.

Thus, in the flow chart shown in FIG. 17, there is completed the procedure from the bus resetting to the declarations of the parent-child relationship among all the nodes in the network.

In the following there will be explained the flow chart shown in FIG. 18.

As the flag information of leaves, branches and root are given to each node in the sequence shown in FIG. 17, such flag information are classified in a step S301. In giving ID to the nodes, the ID setting can be initiated from a leaf. The ID setting is executed in the order of leaves, then branches and root, and in the increasing order of the node number starting from 0.

A step S302 sets the number N (being a natural number) of the leaves present in the network. Then, in a step S303, each leaf request an ID to the root. In case of plural requests, the root executes an arbitration in a step S304, and, in a step S305 gives ID to the winning node and informs the losing nodes of the losing results.

In a step S306, the leaf confirms whether the ID has been acquired, and, if not, returns to the step S303 and issues the request for ID again, and the sequence is similarly repeated. The leaf having acquired ID transfers, in a step S307, the ID information to all the nodes by broadcasting.

After the broadcasting of the ID information of a node, a step S308 decreases the number of the remaining leaves by one. If a step S309 identifies that at least one leaf remains, the sequence starting from the ID request in the step S303 is repeated for the remaining leaf.

When all the leaves have finally broadcast the ID information, the step S309 identifies N=0, whereupon the ID setting shifts to branches. The ID setting for the branches is executed in a similar manner as in the case of leaves. At first a step S310 sets the number M (being a natural number) of the branches present in the network. Then, in a step S311, each branch requests an ID to the root.

In response, the root executes an arbitration in a step S312, and gives an ID number, next to the numbers already given to the leaves, to a winning node. In a step S313, the root informs the requesting branches with the ID information or the losing results. In a step S314, the branch confirms whether the ID has been acquired, and, if not, returns to the step S311 and issues the request for ID again, and the sequence is similarly repeated. If the ID has been acquired, the branch transfers, in a step S315, the ID information to all the nodes by broadcasting.

After the broadcasting of the ID information of a node, a step S316 decreases the number of the remaining branches by one. If a step S317 identifies that at least one branch remains, the sequence starting from the ID request in the step S311 is repeated for the next branch. The sequence is executed until the ID information is broadcast from all the branches. When all the branches have finally acquired the ID information, the step S317 identifies M=0, whereupon the ID acquisition mode for the branches is terminated.

In this state, the root node only has not acquired the ID information. Thus, in a step S318, the root sets the smallest ungiven number as its own ID number, and a step S319 broadcast the ID information of the root to all the nodes.

In this manner there is completed the procedure after the determination of the parent-child relationship to the ID setting for all the noes as shown in FIG. 18.

In the following there will be explained, as an example, the operations in an actual network shown in FIG. 9. FIG. 9 shows a hierarchic structure in which nodes A and C are directly connected under a root node B, while a node D is directly connected under the node C, and nodes E, F are connected under the node D. In the following there will be given an explanation on such hierarchic structure and the procedure of determining the root node and the node ID's.

After bus resetting, there is executed the declaration of the parent-child relationship between the directly connected ports of the nodes, in order to recognize the connection status of the nodes. In the parent-child relationship, the parent side assumes a higher position and the child side assumes a lower position in the hierarchic structure. After the bus resetting in the configuration of FIG. 9, the parent-child declaration is at first executed by the node A.

Basically, the parent-child declaration can be started from a node having connection only at one port thereof (such node being called a leaf). Such node can identify that it has the connection at one port only and can therefore know that it constitutes an end of the network, and the parent-child relationship is determined from a fast reacting one among such leaves. Thus the port of the side declaring the parent-child relationship (namely node A in the connection A-B) is set as a child, and the port of the partner (node B) is set as a parent. Thus in the connections A-B, E-D and F-D there are respectively determined a child and a parent.

Then the procedure shifts to an upper level, and the parent-child relationship declaration is made to a further higher level, starting from the nodes, among those having port with plural connections (such node being called a branch), having received the parent-child declaration from other nodes. In the example shown in FIG. 9, the node D, after the determination of the parent-child relationship in D-E and D-F, declares the parent-child relationship to the node C, whereby the nodes D, C are respectively determined as a child and a parent in the connection D-C. The node C, having received the parent-child declaration from the node D, declares the parent-child relationship to the node B connected to another port, whereby the nodes C, B are respectively determined as a child and a parent in the connection C-B.

As a result the hierarchic structure shown in FIG. 9 is determined, and the node B finally becoming the parent in all the connected ports is determined as the root node. There exists only one root within a network configuration.

In the configuration shown in FIG. 9 the node B is determined as the root node, but the root node may shift to another node if the node B, having received the parent-child declaration from the node A, executes the parent-child declaration to another node at an earlier timing. Thus, depending on the timing of declaration, any node may become the root node, and the root node is therefore not fixed in a given network configuration.

After the determination of the root node, there is entered the mode of determining the node ID. Each of all the nodes informs all other nodes of the determined self ID (broadcasting function). The self ID information contains the self node number, information on the connected position, number of ports, number of connected ports, information on the parent-child relationship of each port etc.

The node ID assignment can be initiated from the nodes having connection only at one port (namely leaves), and the node numbers are assigned in the order of 0, 1, 2, . . . among such leaves. The node having acquired the node ID transmits the information including the node number to other nodes by broadcasting. Thus such ID number is recognized as "already assigned".

When all the leaves have acquired the self node ID's, the process shifts to the branches and the ID numbers succeeding to those assigned to the leaves are then assigned to the branch nodes. As in the case of leaf, branches having acquired the node ID number broadcast the node ID information in succession, and the root node at last broadcasts the self ID information. Consequently the root node always has the largest node ID number.

In this manner the node ID assignment is completed for the entire hierarchic structure, whereby the network configuration is reconstructed and the bus initialization is completed.

[Arbitration]

In the 1394 serial bus, an arbitration for the bus use right is always executed prior to the data transfer. The 1394 serial bus is a logic bus-type network in which the same signal is transmitted to all the devices in the network by the relaying function of each connected device, so that the arbitration is indispensable for avoiding packet collision. Through such arbitration, only one node can execute data transfer at a given time.

Figure 10B:
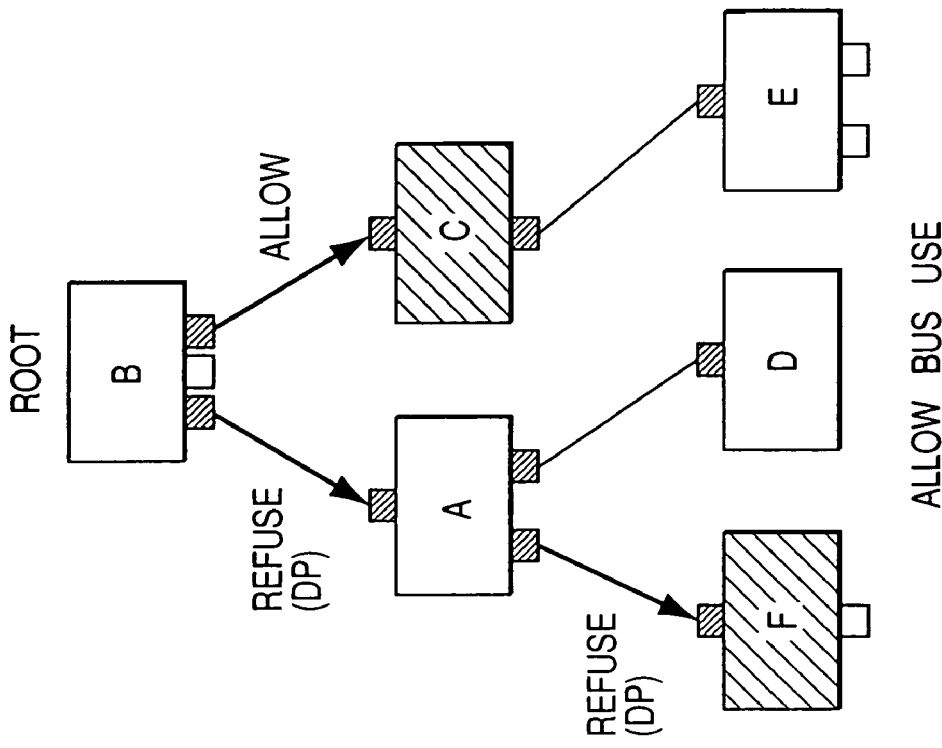
FIGS. 10A and 10B are views showing an arbitration for acquiring the bus use right.
Figure 10A:
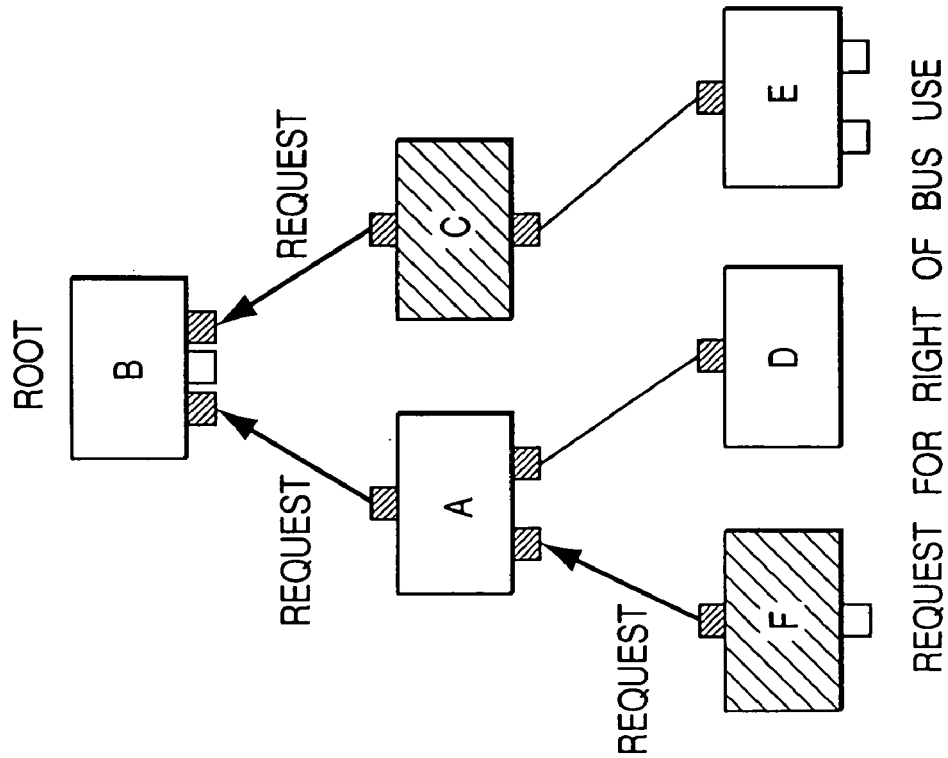

The arbitration procedure will be explained with reference to FIG. 10A showing the operation of requesting the bus use right and FIG. 10B showing the operation of permitting the bus use right. The bus arbitration will be explained in more details with reference to FIGS. 10A and 10B.

When the arbitration is initiated, a node or each of plural nodes issues a request for the bus use right to the parent node. In FIG. 10A, the nodes C and F issue the requests. In response, the parent node (node A in FIGS. 10A and 10B) issues (or relays) the request for the bus use right to a parent node. The request is finally delivered to the arbitrating root.

Receiving the request for the bus use right, the root node determines the node by which the bus is to be used. The arbitrating operation is executed only by the root node, and the permission to use the bus is given to the winning node in the arbitration. FIG. 10B shows an example in which the permission is given to the node C while the use by the node F is refused. A DP (data prefix) packet is transmitted to the losing node, indicating the refusal of the request. The request for the bus use right from the refused node has to wait until the next arbitration.

The node having won the arbitration and acquired the permission for using the bus can thereafter start the data transfer.

Figure 19:
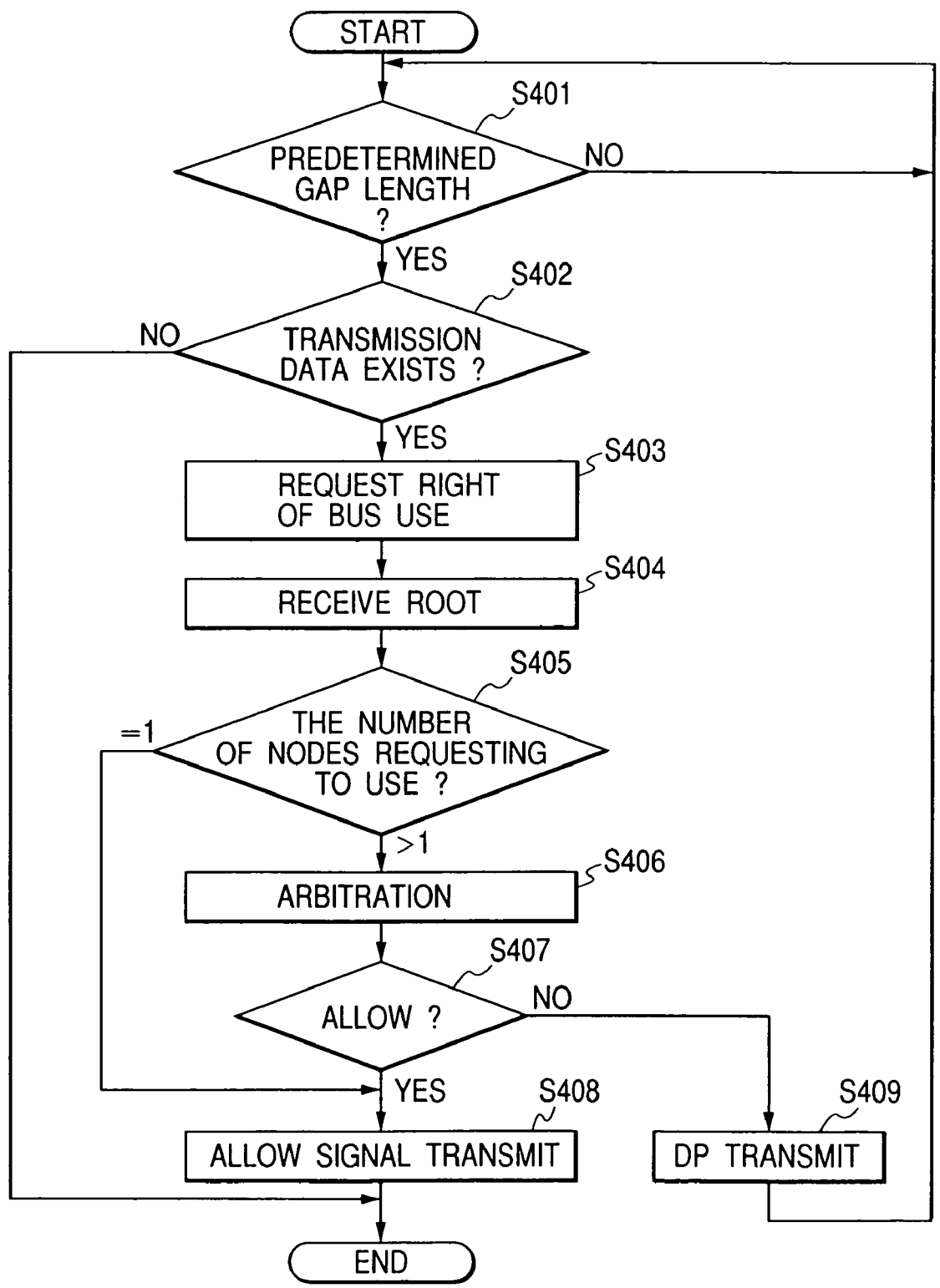
FIG. 19 is a flow chart showing the sequence of arbitration.

The flow of the arbitration will be explained with reference to a flow chart shown in FIG. 19.

In order that the node can initiate the data transfer, the bus has to be in the idle state. In order to recognize that the bus is currently empty after the completion of the preceding data transfer, there is judged the lapse of a predetermined idle time gap length (for example subaction gap) set for each transfer mode, and each node judges that it can start its data transfer after the lapse of such time gap.

More specifically, a step S401 discriminates whether a predetermined gap length is obtained corresponding to the data to be transferred such as the async data or iso data. The sequence waits until the predetermined gap length is obtained, since the bus use right required for starting the data transfer cannot be requested unless such gap length is obtained. The predetermined gap length is obtained in the step S401, a step S402 discriminates whether data to be transferred are present.

If such data are present, a step S403 issues a request for the bus use right for securing the bus to the root for the data transfer. The signal representing the request for the bus use right is transmitted through the nodes in the network as shown in FIG. 10A and eventually delivered to the root. If the step S402 identifies absence of data, the sequence remains in the waiting state.

Then, if the root receives in a step S404 at least a request for the bus use right issued in the step S403, the root checks in a step S405 the number of the nodes having issued the request. If the step S405 identifies that the node number issuing the request=1, the permission to use the bus is to be given to such node immediately thereafter.

If the step S405 identifies that the requests are issued from plural nodes, the root executes in a step S406 an arbitration for selecting one node for giving the permission. This arbitration is conducted in such fair manner that the permissions are not given to a particular node but uniformly given to all the nodes. Then, in a step S407, the root classifies, among the plural nodes having issued the request, a winning node that has acquired the permission by the arbitration and other losing nodes.

In a step S408, the root sends a permission signal to the single node that has acquired the permission as the result of the arbitration in the step S406 or without the arbitration in case the node number=1 in the step S405, and the node having received the permission signal immediately initiates the transfer of the data (packet) to be transferred.

The root also sends, in a step S409, the aforementioned DP packet indicating the loss in the arbitration to the node with which has failed to acquire the permission in the arbitration in the step S406. The node which has received the DP packet returns to the step S401 in order to issue again the request for the bus use right for data transfer, and waits until the predetermined gap length is obtained.

[Asynchronous (Non-Sync) Transfer]

Figure 11:
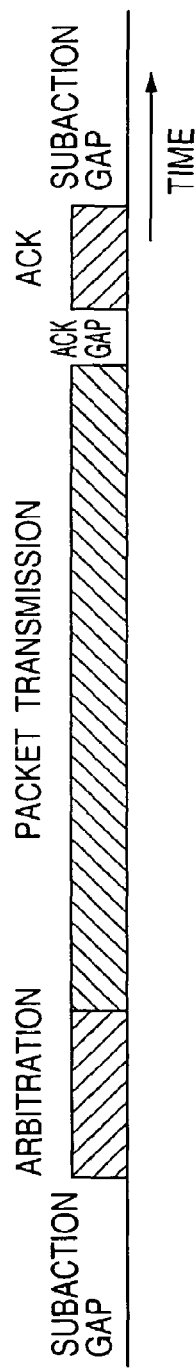
FIG. 11 is a view showing phase transitions in time in asynchronous transfer.

The asynchronous transfer is a non-synchronized transfer. FIG. 11 shows phases in time of the asynchronous transfer, in which the initial subaction gap indicates the idle state of the bus. When this idle time reaches a predetermined value, the node wishing the data transfer judges that the bus is available and enters the arbitration process for acquiring the bus use right.

When the bus use right is acquired in the arbitration, the data transfer is executed in a packet transfer format. After the data transfer, the receiving node completes the transfer by returning an acknowledgement code "ack" indicating the result of reception or sending a response packet, after a short gap called "ack gap". The "ack" code consists of 4-bit information and 4 check sum bits, including information indicating whether the transfer is successful or pending or the like is busy, and is immediately returned to the transmitting node.

Figure 12:
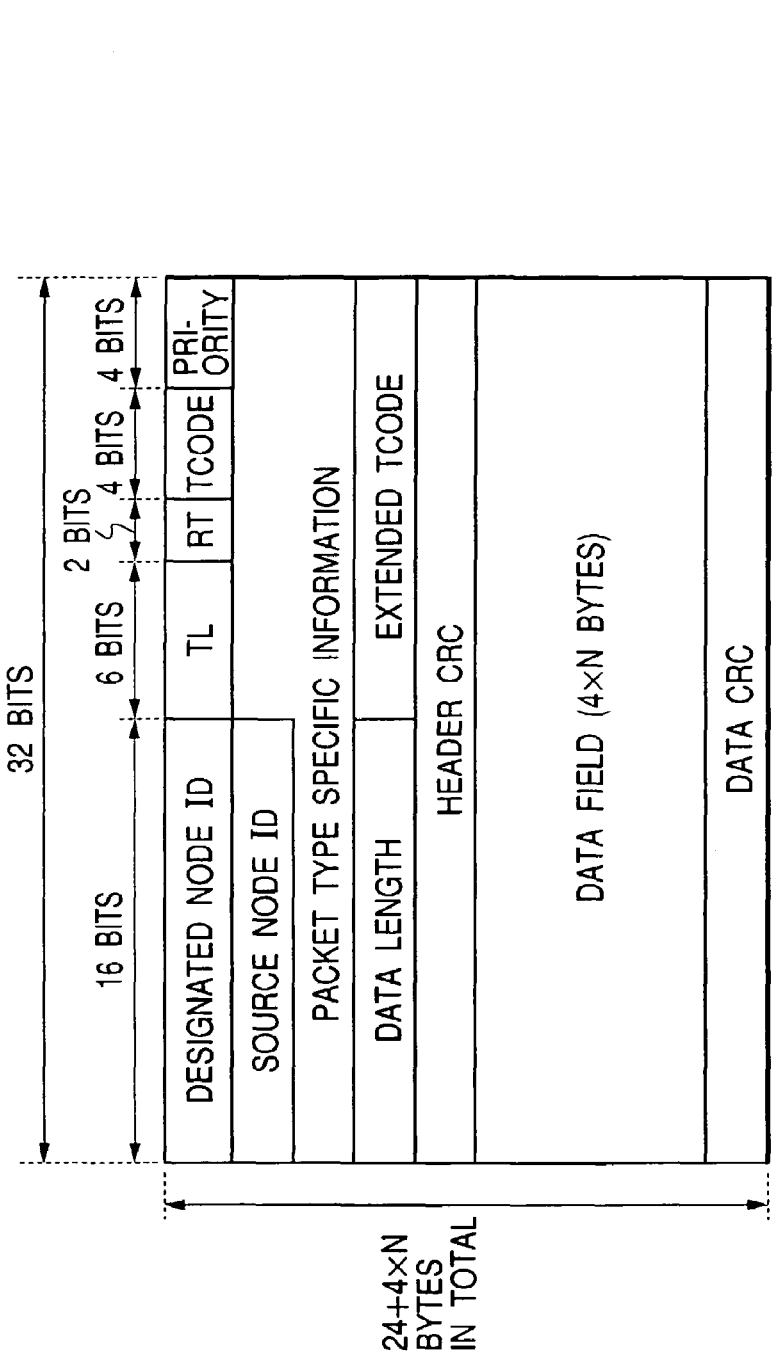
FIG. 12 is a view showing an example of the packet format the asynchronous transfer.

FIG. 12 shows an example of the packet format for the asynchronous transfer. The packet consists of a data portion, CRC data for error correction and a header, which contains, as shown in FIG. 12, a destination node ID, a source node ID, a transfer data length and various codes.

The asynchronous transfer is a 1-to-1 communication from the source node to the destination node. The packet transferred from the source node is delivered to all the nodes in the network, but is disregarded in the nodes different in address and is read by the only one node of the address.

[Isochronous (Sync) Transfer]

The isochronous transfer is a synchronized transfer. The isochronous transfer, constituting the most important feature of the 1394 serial bus, is particularly suitable for transfer of the data requiring real-time transfer, for example multimedia data such as video image data or audio data. In contrast to the asynchronous transfer in the 1-to-1 form, the isochronous transfer is conducted from the transferring source node to all other nodes uniformly by the broadcasting function.

Figure 13:
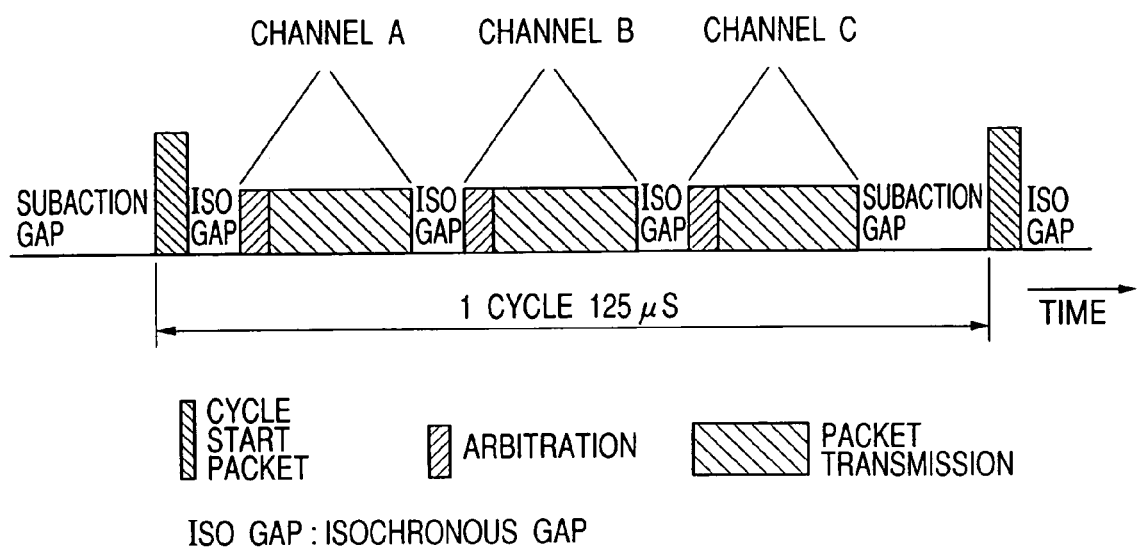
FIG. 13 is a view showing phase transitions in time isochronous transfer.

FIG. 13 shows phases in time of the isochronous transfer. The isochronous transfer is executed on the bus at a constant interval, which is called the isochronous cycle and is selected as 125 μs. A cycle start packet indicates the start time of the isochronous cycle, thus adjusting the time in each node.

The cycle start packet is transmitted by a node called cycle master, which transmits the cycle start packet indicating the start of a cycle, after the lapse of a predetermined idle time (subaction gap) following the end of transfer in the immediately preceding cycle. Thus the cycle start packets are transmitted with an interval of 125 μs.

As indicated by channels A, B and C in FIG. 13, the packets of plural kinds within a cycle are respectively given channel ID's and can be distinguished in the transfer. Consequently the real-time simultaneous transfers among plural nodes are made possible, and the receiving node fetches the data of a desired channel ID only. The channel ID does not indicate the address of the destination but merely gives a logic number to the transferred data. Consequently any packet is transmitted by broadcasting from a source node to all other nodes.

Prior to the isochronous packet transfer, there is executed an arbitration for the bus use right as in the case of asynchronous transfer. However, in the isochronous transfer, which is not the 1-to-1 transfer, there is no acknowledgement code.

The isochronous gap (iso gap) shown in FIG. 13 indicates an idle time required for confirming the availability of the bus, prior to the start of the isochronous transfer. When this idle time lapses, the node wishing the isochronous transfer judges that the bus is available and can enter the arbitration prior to the data transfer.

Figure 14:
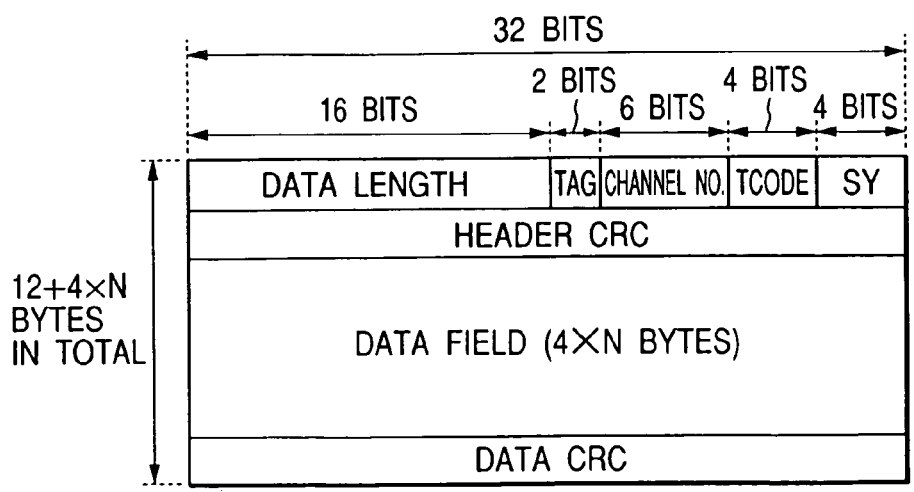
FIG. 14 is a view showing an example of the packet format in the isochronous transfer.

FIG. 14 shows an example of the packet format for the isochronous transfer, to be explained in the following.

The packet divided in each channel consists of a data portion, CRC data for error correction and a header, which contains, as shown in FIG. 14, a transfer data length, a channel number, various codes and error correcting CRC data.

[Bus Cycle]

Figure 15:
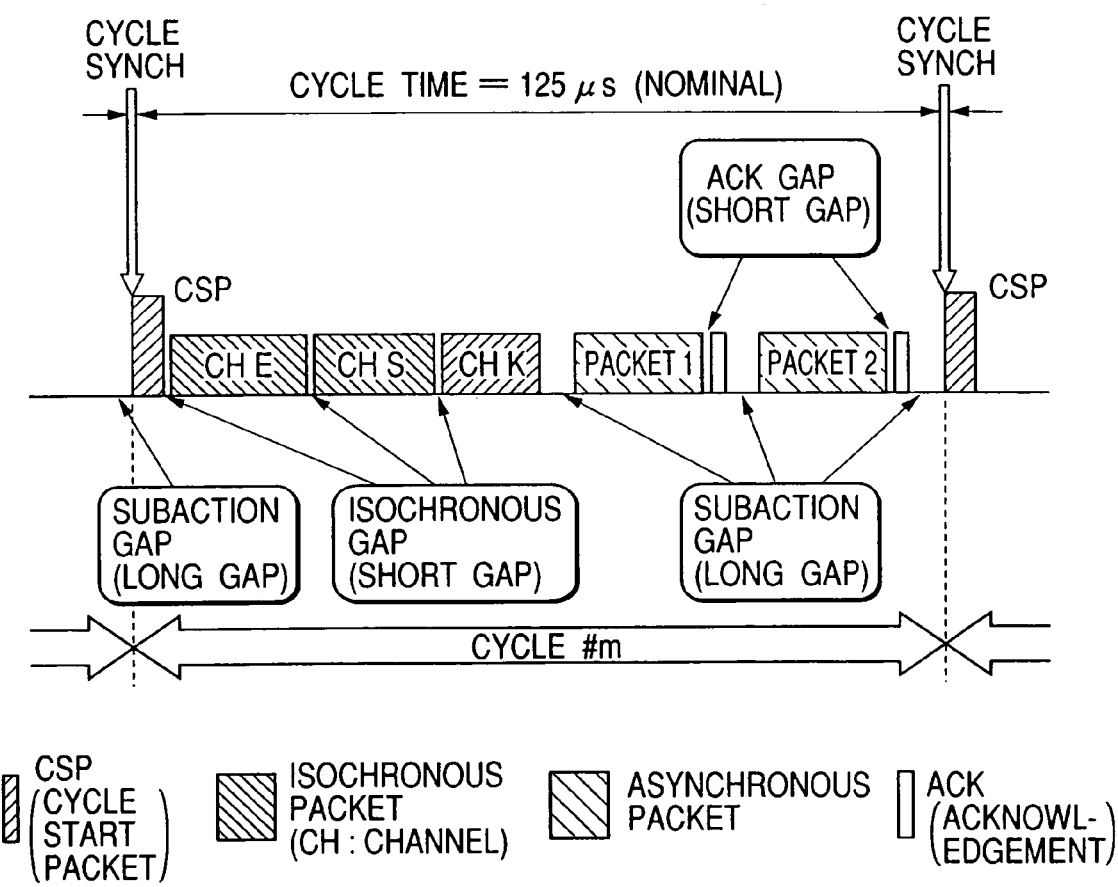
FIG. 15 is a view showing transitions in time of the transfer state on the bus where the isochronous transfer and the asynchronous transfer are mixedly present.

On the actual 1394 serial bus, the asynchronous transfer and the isochronous transfer can be present in mixed manner. FIG. 15 shows phases in time of the transfer state on the bus wherein the asynchronous transfer and the isochronous transfer are present in mixed manner.

The isochronous transfer has the higher priority of execution than the asynchronous transfer, because, after the cycle start packet, the isochronous transfer can be activated with a shorter gap length (isochronous gap) of the idle period than the gap length (subaction gap) required for activating the asynchronous transfer. Therefore the isochronous transfer is executed preferentially to the asynchronous transfer.

In a general bus cycle shown in FIG. 15, the cycle start packet is transferred from the cycle master to other nodes at the start of a cycle #m. In response each node executes time adjustment, then the node wishing the isochronous transfer enters arbitration after waiting for the predetermined idle period (isochronous gap) and then transfers the packet. In FIG. 15, the isochronous transfer is executed in succession in the channels e, s and k.

The sequence from the arbitration to the packet transfer is repeated for the number of assigned channels to complete the isochronous transfer in the cycle #m, and the asynchronous transfer is then enabled. More specifically, when the idle time reaches the subaction gap required for the asynchronous transfer, the node wishing the asynchronous transfer judges that it can enter the arbitration. However, the asynchronous transfer is enabled only if the subaction gap required for activating the asynchronous transfer can be realized within the period from the end of the isochronous transfer to the time (cycle synch) for transferring the next cycle start packet.

The cycle #m shown in FIG. 15 executes, after isochronous transfer of 3 channels, asynchronous transfer of 2 packets (packets 1 and 2) including the acknowledgements. The cycle #m ends after the asynchronous packet 2 because there is reached the time (cycle synch) for starting the cycle #m+1 before the subaction gap is reached.

However, if the time (cycle synch) for transmitting the next cycle start packet is reached in the course of an isochronous or asynchronous transfer, such transfer is not interrupted but the cycle start packet of the next cycle is transmitted in the idle time after the end of such transfer. Thus, if a cycle continues in excess of 125 μs, the next cycle is made correspondingly shorter than 125 μs. In this manner the isochronous cycle can be made longer or shorter, taking 125 μs as the standard.

The isochronous transfer is always executed in every cycle in order to maintain the real-time transfer, while the asynchronous transfer may be delayed to the next or subsequent cycle in case the cycle time is shortened. The cycle time, including information on such delay, is managed by the cycle master.

In the foregoing, there has been summarized the functions of IEEE 1394 serial bus.

In the following there will be briefly explained the enciphering method in the present embodiment.

In enciphering the general communication information, there are principally employed the common key enciphering method and the open key enciphering method. At first there will be explained the common key enciphering method.

[Common Key Enciphering Method]

Among the enciphering algorithms, the common key enciphering method employs a common key in the enciphering and deciphering. The common key enciphering method can be generally divided into the stream cipher and the block cipher.

(1) Stream Cipher

The stream cipher method executes enciphering, for example in enciphering a plain text consisting of bits "0" and "1", by adding a 1-bit key "1" or "0" generated by random numbers, to each bit of the plain text by exclusive logic summing. The enciphered information can be transmitted bit by bit, whereby the information transmitting speed can be made higher. Also, since the enciphering is executed for each bit, the error in enciphering does not propagate to other bits. However, since it is difficult to share, at the transmitting side and the receiving side, the randomly generated key of an information amount same as that of the text to be transmitted, it is common to share a short random number and to generate a pseudo random number with a relatively simple function, based on such shared short random number.

(2) Block Cipher

The block cipher executes enciphering by entering the plain text of a block consisting of a certain number of bits and enciphering the entire block as a cipher text of a block. In such block cipher method, the cipher can be obtained by a relatively simple calculation such as replacement or rearrangement of the plain text. In this method, the replacement or rearrangement is executed by a key, consisting of numeral parameters, on the plain text of a block. The information entered next is also similarly enciphered in the unit of a block.

In contrast to the bit-by-bit enciphering as in the stream cipher described above, this method is associated with a drawback that it is difficult to uniformly randomize the enciphered information because the replacement or rearrangement of the bits is simply repeated. There also results a drawback of a longer transfer time because the replacement or rearrangement has to be repeated many times in order to approach to the uniform randomization.

[Open Key Cipher Method]

Among the cipher algorithms, a method employing different keys in the enciphering and in the deciphering is called the open key cipher method. In this method, the enciphering key is disclosed to the partner of information communication, and the key for deciphering the information enciphered with such enciphering key is held in secrecy. The disclosed key is called the open key, while the key held in secrecy is called the secret key. It is not possible to estimate the secret key from the open key, but these two keys are formed in pair, and the cipher information formed by the open key can be deciphered only with the secret key.

This method has an advantage of higher security of the key (the secret key alone has to be held in secrecy by the receiving side), but is also associated with a disadvantage of requiring a process time longer, by about 1,000 times, than in the common key cipher method. For this reason, there are being employed methods utilizing both the common key cipher and the open key cipher. An example of such methods will be explained in the following.

The transmitting side at first requests the transmission of an open key to the receiving side, and transmits, to the receiving side, a common key enciphered with the open key cipher from the receiving side, whereby the common key cipher is shared between the transmitting side and the receiving side. The process time can be made relatively short, by then transmitting the information enciphered with such common key cipher.

In the present embodiment, one of the methods described above is employed for enciphering.

FIGS. 1A and 1B are schematic views of the configuration of a mobile communication terminal of an embodiment of the present invention, respectively showing a PDA (personal digital assistant) of the transmitting side and a PDA of the receiving side.

As shown in FIG. 1A, the PDA 1 of the transmitting side is composed of an information process unit 3 for executing various processes in the terminal, a cipher process selection unit 4, an enciphered signal process unit 5, and an information transmission/reception unit 6. The cipher process selection unit 4 discriminates whether the transmitting PDA 1 and the receiving PDA 2 are directly connected for example by the 1394 serial bus, whether the receiving PDA 2 is equipped with a cipher process unit and whether the enciphering request is sent from the transmitting side, and selects whether or not to execute the enciphering according to the result of such discriminations. Also the enciphered signal process unit 5 executes enciphering of the signal and conversions of the enciphered signal into the original signal.

Also as shown in FIG. 1B, the PDA 2 of the receiving side is composed of an information process unit 7 and an information transmission/reception unit 9 which are similar to the information process unit 3 and the information transmission/reception unit 6 in the transmitting PDA 1, a reception error process unit 8 for informing the transmitting side and the receiving side of a reception error in case of reception of the enciphered information signal, and a reception error display unit 10. In the present embodiment, the PDA 2 of the receiving side is not equipped with a unit corresponding to enciphered signal process unit 5 in the transmitting side, and is therefore incapable of decoding and utilizing the enciphered signal in case such enciphered signal is received.

In the following there will be explained the communicating operations in the PDA's of the above-described configuration. At first an information signal d1, generated by the information process unit 3 of the transmitting PDA 1, is supplied to the enciphered signal process unit 5. In case a request signal d3 for enciphering is issued, the cipher process selection unit 4 converts thus generated information signal d1 into an enciphered signal d2, which is then supplied to the information transmission/reception unit 6 whereupon the transmission is initiated. On the other hand, in the absence of the enciphering request signal d3, the information signal d1 is directly supplied to the information transmission/reception unit 6 and is transmitted.

The receiving PDA 2 receives the information signal d1 or the enciphered signal d2 by the information transmission/reception unit 9, and the received signal is supplied to the reception error process unit 8 in order to discriminate whether the received signal is enciphered or not. In case the reception error process unit 8 identifies that the received signal is the enciphered signal d2, this fact is informed to the receiving person by the reception error display unit 10, and a reception error message d4 is also transmitted to the source of transmission. On the other hand, in case the reception of the non-ciphered information signal d1 is identified, the information signal d1 is supplied to the information process unit 7 and is utilized.

Flow charts shown in FIGS. 2A and 2B show the operation sequence of the PDA of the present embodiment, respectively in the transmitting side and the receiving side.

Referring to FIG. 2A, if an information communication request is made in a step S1 from the transmitting side, a step S2 discriminates, by the cipher process selection unit 4, whether a cipher process is requested by the transmitting person.

The cipher process request mentioned above is made, for example, in case:

1) a high level of secrecy is set for the information in advance by the transmitting person;

2) information is transmitted to a receiving person set in advance by the transmitting person; and 3) a request for enciphering is set in advance by the transmitting person:

and a cipher request signal d5 is generated. In the presence of the cipher request signal d5, the cipher process selection unit 4 generates a cipher request signal d3 to the cipher signal process unit 5, which in response executes enciphering of the information in a step S5.

On the other hands, in case the step S2 identifies absence of the cipher request signal d5, the sequence proceeds to a step S3 for discriminating whether the transmitting PDA 1 and the receiving PDA 2 are directly connected to a registered server (not shown). The discrimination is made by the cipher process selection unit 4, based on a connection status signal d8 of the PDA, transmitted from the unrepresented server, as shown in FIGS. 1A and 1B.

In case both PDA's are directly connected to the server, the cipher process selection unit 4 issues the cipher request signal d3 to the enciphered signal process unit 5, which, in response, executes the enciphering of the information in the step S5. On the other hand, at least either of the PDA's is not directly connected to the server, the sequence proceeds to a step S4 to discriminate whether the receiving PDA 2 permits enciphering.

The discrimination in the step S4 may be made, for example, by registering the information of the receiving PDA 2, including whether the enciphering is permitted or not, in the server and by referring to such information. It may also be made, as shown in FIGS. 1A and 1B, by transmitting a discrimination request signal d6 from the cipher process selection unit 4 of the transmitting side to the information process unit 7 of the receiving side, discriminating whether the enciphering is permitted or not by the information process unit 7 of the receiving side, and returning a discrimination signal d7 indicating whether the enciphering is permitted or not (not permitted in the example shown in FIGS. 1A and 1B) from the information process unit 7 of the receiving side to the cipher process selection unit 4 of the transmitting side.

In case the result of discrimination indicates that the enciphering is not permitted, the step S5 for enciphering is skipped and the step S6 initiates the transmission of the information signal. In case the result of discrimination indicates that the enciphering is permitted, the cipher process selection unit 4 issues the cipher request signal d3 to the cipher signal process unit 5, which in response executes enciphering in the step S5. Subsequently the enciphered signal is transmitted in the step S6.

The receiving PDA 2, upon receiving the signal in a step S7, stores the received signal in an unrepresented sub memory in a step S8, and, in a step S9, causes the reception error process unit 8 to discriminate whether the received signal is enciphered. If enciphered, a step S11 causes the reception error display unit 10 to display the reception error to the receiving person, and, in a step S12, transmits a reception error message d4 to the source of transmission.

On the other hand, if the received signal is not enciphered, a step S10 stores the received signal in an unrepresented main memory, and a step S13 terminates the reception process. The information signal d1 stored in the main memory can thereafter be utilized by the information process unit 7.

Figure 3:
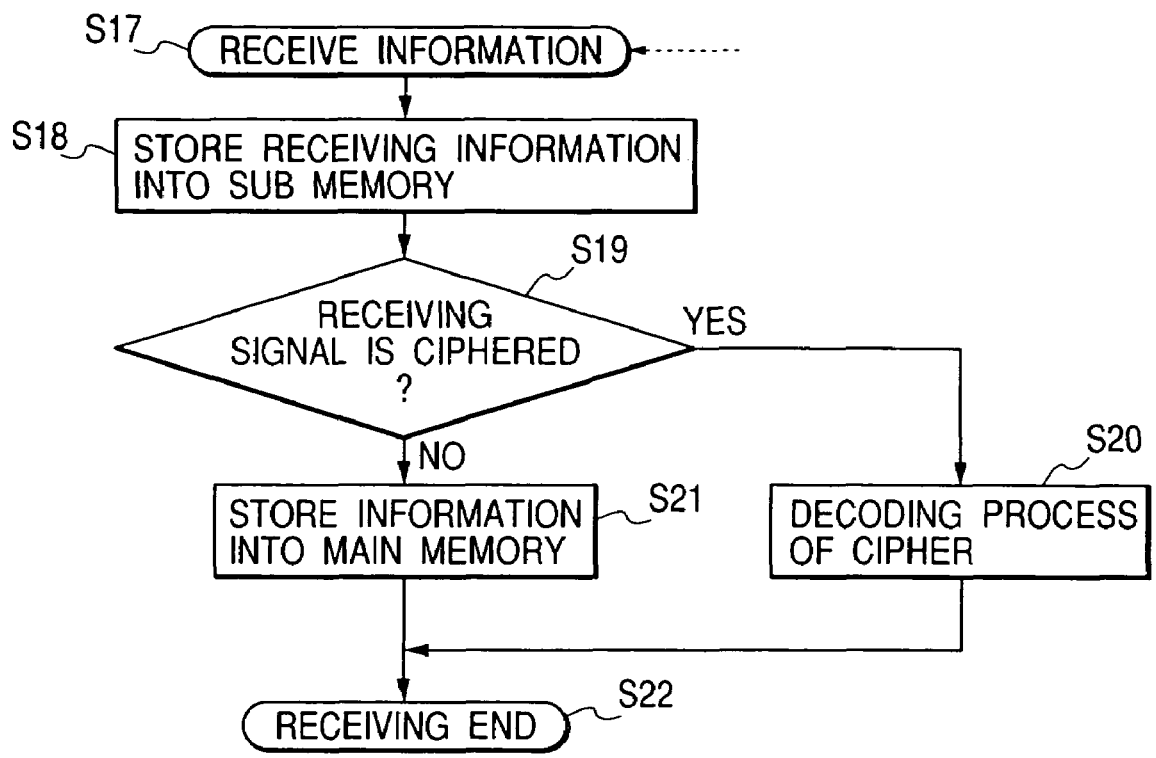
FIG. 3 is a flow chart showing the function of the receiving mobile terminal of the embodiment in case it is provided with an enciphering function.

FIG. 3 is a flow chart showing the process in case the PDA apparatus 2 of the receiving side has a configuration same as that of the PDA apparatus 1 of the transmitting side shown in FIG. 1A.

At first, when the signal is received in a step S17, a step S18 stores the received signal in the unrepresented sub memory and a step S18 discriminates whether the received signal is enciphered.

If the received signal is enciphered, the sequence proceeds to a step S20 to decipher the cipher by the ciphered signal process unit 5. Then a step S21 stores the deciphered signal in the unrepresented main memory, and a step S22 terminates the reception process. On the other hand, if the received signal is not enciphered, the step S21 stores the received signal in the unrepresented main memory and the step S22 terminates the reception process.

In the present embodiment, as explained in the foregoing, the information transmitting side is provided with the cipher signal selection unit 4 for selecting whether or not to use the enciphering of the information, thereby omitting the enciphering process as far as possible and alleviating the burden of signal processing and process relating to the enciphering. Also in case the information receiving side is not provided with the cipher function, even if the enciphered signal is transmitted to the receiving side, the receiving side handles such communication as a reception error and gives an error message to the transmitting person and to the receiving person, whereby the failure in the communication can be found promptly and coped with adequately.

In such configuration, the cipher process selection unit 4 for example discriminates the level of secrecy of the information to be transmitted and determines whether or not to use the enciphering process according to the level of secrecy. For example, a single information communication terminal may be utilized both for the home and for the business use. In such situation, there can be considered a mode of not using the enciphering process in the communication with the family and using the enciphering process, thereby maintaining secrecy, in the communication for the business. In such case, there can be conceived a mode of use in which the information transmitting person registers in advance the addressed of predetermined receiving persons in the information communication terminal of the transmitting person, and the enciphering process is automatically canceled in the communication with such registered address but is adopted in other communications.

Also in case the information communication terminal is used both for the home use and for the business use, there can be conceived a requirement of reducing the communication with the family as short as possible and extending the access time for business use as long as possible. The present embodiment allows to meet this requirement by dispensing with the enciphering process in the communication for home use. It is furthermore possible to enter the level of secrecy of the information into the communication apparatus by the transmitting person in each information transmission and to cause the apparatus to discriminate the level of secrecy of such information.

Also the present embodiment determines whether or not to adopt the enciphering process by discriminating whether the information transmitting person and the information receiving person utilize a relaying equipment such as a server as the communication medium. For example the information transmission in the home, not utilizing server, has a low level of secrecy and the danger of eavesdropping is lowered by employing a cable or the like for connecting the terminals. In such case, the enciphering process can be dispensed with to alleviate the burden for the enciphering process and to achieve a higher speed in the transmission and reception of the information. On the other hand, in case of outdoor wireless communication through the server, the danger of eavesdropping is higher and the secrecy can be maintained by adopting the enciphering process.

Also in the present embodiment, there is discriminated whether the information receiving side permits enciphering (namely whether the deciphering is possible at the information receiving side), and the enciphering process is adopted or not respective if the deciphering is possible or not, whereby it is rendered possible to alleviate the burden of enciphering at the transmitting side. Also the cipher process means may be dispensed with in the information communication apparatus of the receiving side, and such simplified structure in the receiving side allows reduction in the cost and in the dimension of the apparatus.

For example, in case a child has a mobile terminal, the communication partner would mostly be a parent or a friend, and the level of secrecy of the communication between the child and the parent or the friend is not expected to be very high. Also the equipment to be used by a child is required to have a durability higher than that of the equipment to be used by an adult. Besides, such terminal is to be carried in a pocket, and there will be required a compact information communication terminal that can be accommodated in a small pocket for children.

In such case, the information communication apparatus of the present embodiment allows to achieve improvement in the durability and compactization, by providing a simple function of executing the reception error process for the enciphered signal and omitting the more complex cipher processes. Also in transmitting information, it is rendered possible to optimize the cipher process by the information communication apparatus provided with a function of not executing the enciphering process in case the communication partner is not provided with the cipher process function.

More specifically, the equipment of the transmitting or receiving side may in advance locate, on the network on which the receiving side is connected, a device incorporating a decoder matching the enciphering method and having assured security and cause such device to execute the decoding process.

Other Embodiments

The present invention also includes a case where the functions of the aforementioned embodiments are realized by supplying an apparatus connected with various devices so as to drive these devices with program codes of a software realizing the functions of the aforementioned embodiment and causing a CPU or an MPU of the apparatus to drive such devices according to the stored program.

In such case the program codes themselves of the software realize the functions of the aforementioned embodiments, and the program codes themselves and the means for supplying the apparatus with such program codes, for example a memory medium storing the program codes, constitute the present invention. The memory medium storing such program codes can be, or example, a floppy disk, a hard disk, an optical disk, a magnetooptical disk, a CD-ROM, a magnetic tape, a non-volatile memory card, or a ROM.

The present invention also includes such program codes not only a case where the functions of the aforementioned embodiments are realized by the execution of the supplied program codes but also a case where an operating system or an application software functioning on the apparatus realize the functions of the aforementioned embodiments.

The present invention further includes a case wherein the program codes read from the memory medium are once stored in a function expansion board inserted into the computer or a function expansion unit connected to the computer, and a CPU provided in the function expansion board or the function expansion unit executes all the process or a part thereof under the control of such program codes, thereby realizing the functions of the aforementioned embodiments.

The aforementioned embodiment, as explained in the foregoing, is provided with the cipher process selection means for selecting whether or not to use the enciphering means for the transmission information at the communication thereof, thereby omitting the enciphering process as far as possible and alleviating the burden of signal processing and process involved in enciphering.

The above-mentioned selection for the enciphering process can be realized by selecting whether or not to use the enciphering means according to the instruction from the information transmitting person.

According to another feature, the selection whether or not to use to the enciphering means is made according to the communication medium connecting the information transmitting apparatus and the information receiving apparatus. Thus, the enciphering process can be dispensed with to alleviate the burden in the enciphering process unless the information is communicated by a communication medium requiring a high level of secrecy (for example outdoor wireless communication), for example in case of information communication in a home.

According to still another feature, the selection whether or not to use to the enciphering means is made according to the discrimination whether the deciphering is possible in the information receiving apparatus. Thus the enciphering process is dispensed with, thereby alleviating the burden for the enciphering process in the transmitting side, in case the receiving side is incapable of deciphering. Besides, the cipher means may be dispensed with in the information receiving apparatus, whereby the compactization and cost reduction can be realized in the apparatus of the receiving side.

According to still another feature, the selection whether or not to use to the enciphering means is made according to the discrimination of the level of secrecy of the transmission information. It is therefore rendered possible to dispense with the enciphering process, thereby alleviating the burden associated with the enciphering process, except for the transmission of the information requiring a high level of secrecy.

According to still another feature, there is discriminated whether the received information is enciphered, and a predetermined error process is executed in case the received information is identified as to be enciphered. Thus, in case the enciphered signal is transmitted to the receiving side which is incapable of deciphering, the receiving side processes such transmission as a reception error, whereby the erroneous communication can be promptly and properly processed.

What is claimed is:

1. An information communication apparatus comprising:
   a) input means for inputting data;
   b) enciphering means for enciphering the data;
   c) judgment means for judging whether or not to perform enciphering based on a reception signal;
   d) selection means for selecting whether or not to use said enciphering means based on a judgment result of said judgment means; and
   e) transmission means for transmitting said enciphered data in case of being selected to use by said selection means, and for transmitting said input data in case of being selected not to use.

2. An information communication apparatus according to claim 1, wherein said reception signal is a signal concerning a communication medium to which the apparatus on a transmission side and the apparatus on a reception side are connected.

3. An information communication apparatus according to claim 1, wherein said reception signal is a signal representing whether or not the apparatus on a reception side can decipher the enciphered data.

4. An information communication apparatus according to claim 1, wherein said reception signal is a signal representing a security level of said data.

5. An information communication method comprising the steps of:
   a) inputting data;
   b) selecting whether or not to encipher the data;
   c) judging whether or not to perform enciphering based on a reception signal;
   d) enciphering the data according to said selection step based on a judgment result of said judging step; and
   e) transmitting said enciphered data in case of being selected to use by said selection step, and transmitting said input data in case of being selected not to use.

6. An information communication method according to claim 5, wherein said reception signal is a signal concerning a communication medium to which the apparatus on a transmission side and the apparatus on a reception side are connected.

7. An information communication method according to claim 5, wherein said reception signal is a signal representing whether or not the apparatus on a reception side can decipher the enciphered data.

8. An information communication method according to claim 5, wherein said reception signal is a signal representing a security level of said data.

9. A computer readable memory medium storing a program for functioning a computer as means described in claim 5.

10. An information communication apparatus according to claim 1, wherein said judgment means judges whether or not to perform the enciphering based on plural reception signals.

* * * * *

UNITED STATES PATENT AND TRADEMARK OFFICE
CERTIFICATE OF CORRECTION

| | |
|---|---|
| PATENT NO. | : 7,089,416 B2 |
| APPLICATION NO. | : 09/412900 |
| DATED | : August 8, 2006 |
| INVENTOR(S) | : Kurumi Mori |

It is certified that error appears in the above-identified patent and that said Letters Patent is hereby corrected as shown below:

Column 16, line 3, "hands" should be changed to --hand--.

Signed and Sealed this

Twenty-second Day of May, 2007

JON W. DUDAS
*Director of the United States Patent and Trademark Office*